US011867129B2

(12) United States Patent
Beauchesne-Martel et al.

(10) Patent No.: US 11,867,129 B2
(45) Date of Patent: *Jan. 9, 2024

(54) SYSTEM AND METHOD FOR OPERATING A MULTI-ENGINE AIRCRAFT

(71) Applicant: PRATT & WHITNEY CANADA CORP., Longueuil (CA)

(72) Inventors: Philippe Beauchesne-Martel, Brossard (CA); Olivier Bibor, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,017

(22) Filed: Mar. 8, 2023

(65) Prior Publication Data
US 2023/0203994 A1 Jun. 29, 2023

Related U.S. Application Data

(63) Continuation of application No. 17/474,325, filed on Sep. 14, 2021, now Pat. No. 11,668,249.

(51) Int. Cl.
*F02C 9/00* (2006.01)
*B64D 31/04* (2006.01)
*B64D 31/12* (2006.01)

(52) U.S. Cl.
CPC .............. *F02C 9/00* (2013.01); *B64D 31/04* (2013.01); *B64D 31/12* (2013.01);
(Continued)

(58) Field of Classification Search
CPC ........ B64D 31/00; B64D 31/04; B64D 31/06; B64D 31/12; B64D 35/08; F02C 9/00;
F02C 9/42; F02C 6/02; B64C 27/04; F05D 2270/02; F05D 2270/13; F05D 2270/309; F05D 2270/335
See application file for complete search history.

(56) References Cited

U.S. PATENT DOCUMENTS 4,831,567 A   5/1989  Lea
9,353,642 B2  5/2016  Certain
(Continued)

FOREIGN PATENT DOCUMENTS

CA    3079045      12/2020
WO    2015145036   10/2015

*Primary Examiner* — Alain Chau
(74) *Attorney, Agent, or Firm* — NORTON ROSE FULBRIGHT CANADA LLP

(57) ABSTRACT

In an asymmetric operating regime, a first engine is operating in an active mode to provide motive power to an aircraft while a second engine is operating in a standby mode and de-clutched from a gearbox of the aircraft. In response to an emergency exit request, the second engine's speed is increased, at a maximum permissible rate, to a re-clutching speed while increasing the first engine's power output at a maximum permissible rate. When the re-clutching speed is reached, the second engine's power output is increased at a maximum permissible rate. In response to a normal exit request, the second engine's speed is increased to the re-clutching speed at a rate lower than the maximum permissible rate. When the re-clutching speed is reached, the second engine's power output is increased at a rate lower than the maximum permissible rate.

20 Claims, 15 Drawing Sheets

(52) U.S. Cl.
CPC .... *F05D 2220/323* (2013.01); *F05D 2270/02* (2013.01); *F05D 2270/13* (2013.01)

(56) References Cited

U.S. PATENT DOCUMENTS

| | | | |
|---|---|---|---|
| 9,387,934 B2 | 7/2016 | Gomez et al. | |
| 10,578,031 B2 | 3/2020 | Lescher et al. | |
| 10,766,629 B2 | 9/2020 | Mercier-Calvairac et al. | |
| 10,773,814 B2 | 9/2020 | Strauss et al. | |
| 10,961,915 B2 * | 3/2021 | Simonetti | F01D 13/00 |
| 11,299,286 B2 * | 4/2022 | Beauchesne-Martel | B64C 27/12 |
| 11,668,249 B2 * | 6/2023 | Beauchesne-Martel | F02C 9/00 701/3 |
| 2008/0006739 A1 * | 1/2008 | Mochida | H02K 16/00 267/136 |
| 2014/0145028 A1 | 5/2014 | Gomez et al. | |
| 2015/0125258 A1 | 5/2015 | Certain | |
| 2016/0237917 A1 | 8/2016 | Marconi et al. | |
| 2017/0101938 A1 | 4/2017 | Lescher et al. | |
| 2018/0073437 A1 * | 3/2018 | Simonetti | F02C 7/26 |
| 2018/0171874 A1 | 6/2018 | Klonowski et al. | |
| 2018/0201386 A1 | 7/2018 | Strauss et al. | |
| 2019/0055004 A1 | 2/2019 | Schaeffer et al. | |
| 2020/0256265 A1 | 8/2020 | Manoukian | |
| 2020/0361620 A1 * | 11/2020 | Beauchesne-Martel | B64C 27/57 |
| 2020/0362753 A1 * | 11/2020 | Beauchesne-Martel | F02C 6/02 |
| 2020/0362754 A1 | 11/2020 | Beauchesne-Martel et al. | |
| 2020/0388092 A1 * | 12/2020 | Manoukian | G07C 5/0816 |
| 2020/0391873 A1 | 12/2020 | Beauchesne-Martel et al. | |
| 2020/0408148 A1 | 12/2020 | Beauchesne-Martel et al. | |
| 2022/0396353 A1 * | 12/2022 | Covington | B64C 27/06 |

* cited by examiner

SYSTEM AND METHOD FOR OPERATING A MULTI-ENGINE AIRCRAFT

TECHNICAL FIELD

The present disclosure relates generally to operating a multi-engine aircraft, and more particularly, to exiting a mode of operation in which engines of the aircraft are operating asymmetrically.

BACKGROUND OF THE ART

Multi-engine aircraft are often provided with two or more engines which typically operate at similar power output levels during normal cruise operating regimes. In order to improve fuel efficiency, the engines may be operated asymmetrically by operating one engine at a higher power than the other engine(s). It is however desirable for an engine operating at lower power to be able to rapidly increase its power output when called upon.

Improvements are therefore desirable.

SUMMARY

In one aspect, there is provided a method for operating an aircraft having two or more engines. The method comprises operating the aircraft in an asymmetric operating regime in which a first one of the two or more engines is operating in an active mode to provide motive power to the aircraft while a second one of the two or more engines is operating in a standby mode in which the second engine is de-clutched from a gearbox of the aircraft; receiving one of an emergency exit request and a normal exit request; in response to the emergency exit request, increasing a rotational speed of the second engine, at a maximum permissible speed rate of change associated with the second engine, to a re-clutching speed to re-clutch the second engine to the gearbox while increasing a power output of the first engine at a first maximum permissible power rate of change associated with the first engine, and when the rotational speed of the second engine reaches the re-clutching speed, increasing a power output of the second engine at a second maximum permissible power rate of change associated with the second engine; and, in response to the normal exit request, increasing the rotational speed of the second engine to the re-clutching speed at a speed rate of change lower than the maximum permissible speed rate of change associated with the second engine, and when the rotational speed of the second engine reaches the re-clutching speed, increasing the power output of the second engine at a first power rate of change, the first power rate of change being lower than the second maximum permissible power rate of change associated with the second engine.

In another aspect, there is provided a system for operating an aircraft having two or more engines. The system comprises a processing unit and a non-transitory storage medium having stored thereon program code executable by the processing unit for operating the aircraft in an asymmetric operating regime in which a first one of the two or more engines is operating in an active mode to provide motive power to the aircraft while a second one of the two or more engines is operating in a standby mode in which the second engine is de-clutched from a gearbox of the aircraft; and receiving one of an emergency exit request, and a normal exit request; in response to the emergency exit request, increasing a rotational speed of the second engine, at a first maximum permissible speed rate of change associated with the second engine, to a re-clutching speed to re-clutch the second engine to the gearbox while increasing a power output of the first engine at a first maximum permissible power rate of change associated with the first engine, and when the rotational speed of the second engine reaches the re-clutching speed, increasing a power output of the second engine at a second maximum permissible power rate of change associated with the second engine; and in response to the normal exit request, increasing the rotational speed of the second engine to the re-clutching speed at a speed rate of change lower than the maximum permissible speed rate of change associated with the second engine, and when the rotational speed of the second engine reaches the re-clutching speed, increasing the power output of the second engine at a first power rate of change, the first power rate of change being lower than the second maximum permissible power rate of change associated with the second engine.

DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for operating a multi-engine aircraft. Under certain conditions, it can be desirable to operate the aircraft in a so-called "asymmetric operating regime" (AOR), which is described in greater detail hereinbelow. When operated in the AOR, multiple engines of the aircraft, which may be a multi-engine helicopter or other rotorcraft, are operated at different output power levels.

Figure 1A:
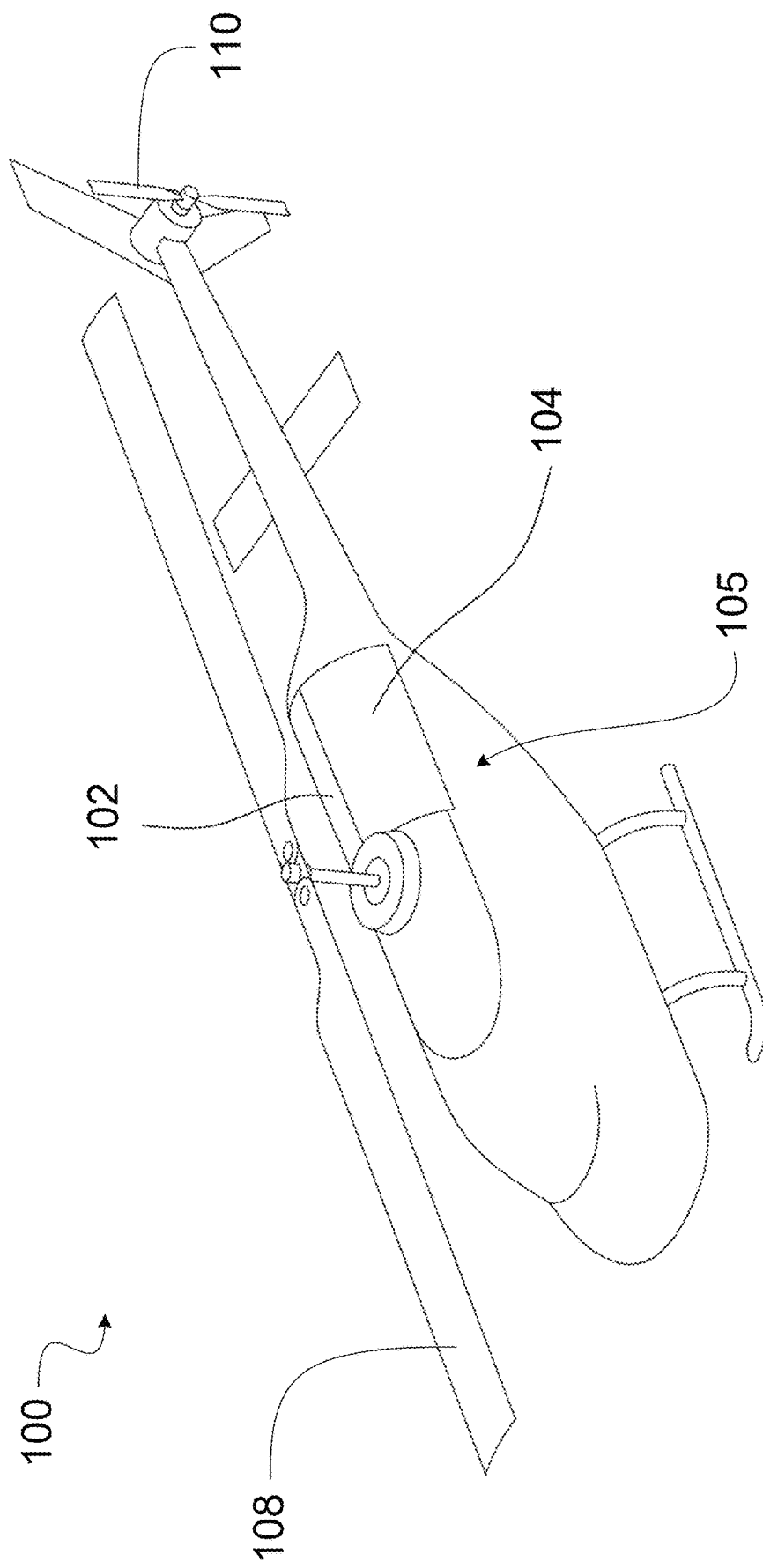
FIG. 1A is a schematic view of a multi-engine aircraft, in accordance with an illustrative embodiment.

FIG. 1A depicts an exemplary multi-engine aircraft 100, which in this case is a helicopter. The aircraft 100 includes at least two gas turbine engines 102, 104. These two engines 102, 104 may be interconnected, in the case of the depicted helicopter application, by a common gearbox to form a multi-engine system 105, as shown in FIG. 1B, which drives a main rotor 108.

Figure 1B:
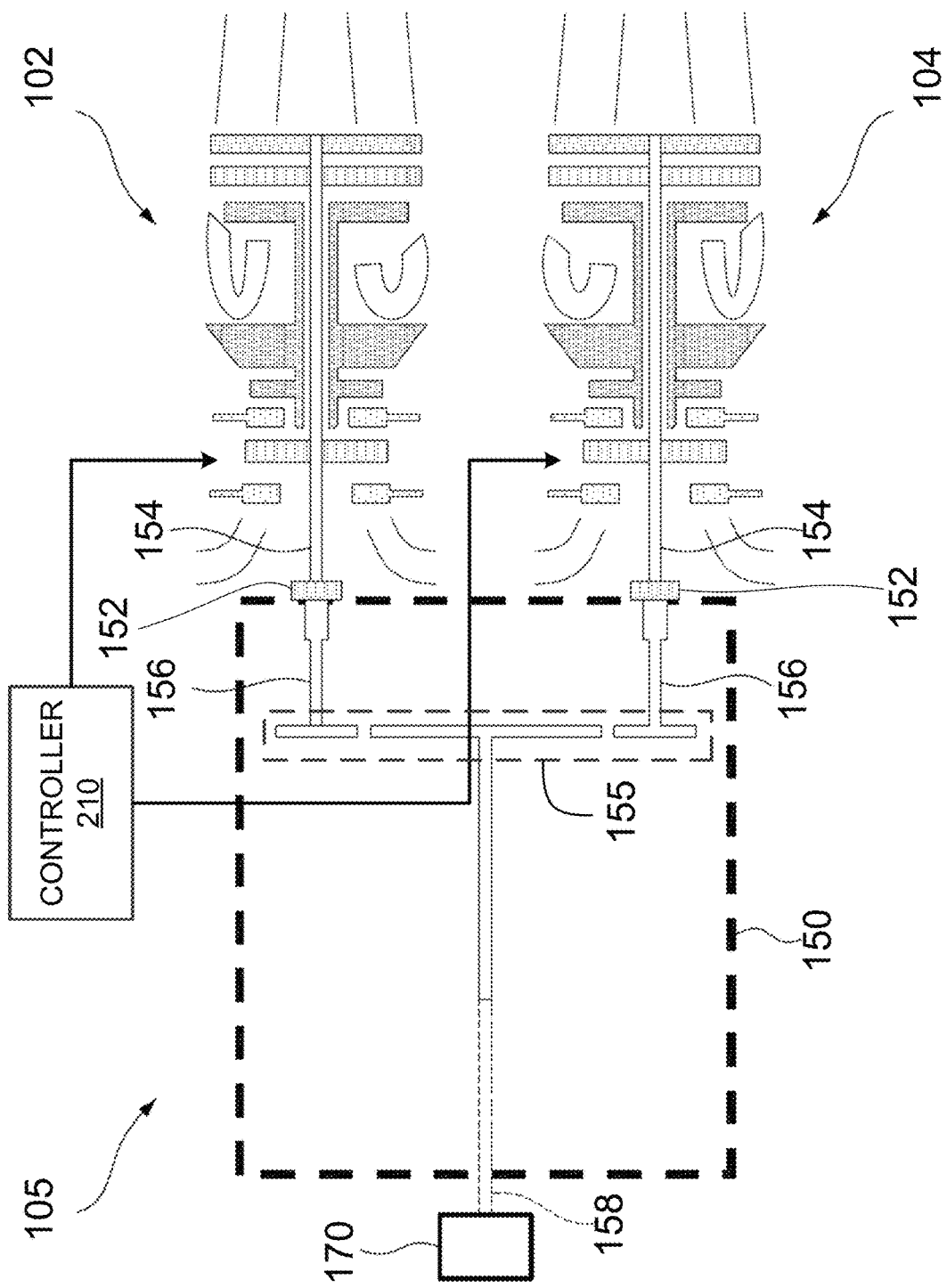
FIG. 1B is a schematic diagram of an exemplary multi-engine system for the aircraft of FIG. 1A, showing axial cross-sectional views of two gas turbine engines, in accordance with an illustrative embodiment.

Turning now to FIG. 1B, illustrated is an example multi-engine system 105 that may be used as a power plant for an aircraft, including but not limited to a rotorcraft such as the helicopter 100. The multi-engine system 105 may include two or more gas turbine engines 102, 104. In the case of a helicopter application, these gas turbine engines 102, 104 will be turboshaft engines. Control of the multi-engine system 105 is effected by one or more controller(s) 210, which may be Full Authority Digital Engine Controller(s) (FADEC(s)), Electronic Engine Controller(s) (EEC(s)), Engine Control Unit(s) (ECU(s)), or the like, that are programmed to manage, as described herein below, the operation of the engines 102, 104 to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 105. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

More particularly, the multi-engine system 105 of this embodiment includes first and second turboshaft engines 102, 104 interconnected by a common output gearbox 150 (also referred to herein as a "main gearbox") to drive a common load 170. In one embodiment, the common load 170 may comprise a rotary wing of a rotary-wing aircraft. For example, the common load 170 may be a main rotor 108 and a tail rotor 110 of the aircraft 100. Depending on the type of the common load 170 and on the operating speed thereof, each of turboshaft engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective turboshaft engines 102, 104. The gearbox 150 may be configured to direct at least some of the combined mechanical energy from the plurality of the turboshaft engines 102, 104 toward a common output shaft 158 for driving the common load 170 at a suitable operating (e.g., rotational) speed. It is understood that the multi-engine system 105 may also be configured, for example, to drive accessories and/or other elements of an associated aircraft. As will be described, the gearbox 150 may be configured to permit the common load 170 to be driven by either of the turboshaft engines 102, 104 or, by a combination of both engines 102, 104 together.

In particular, in one embodiment, the output shaft 154 of each engine 102, 104 may be connected through a coupling (not shown) to an input module (not shown) from the gearbox 150. Each input module may comprise a first reduction stage (not shown) and a clutch 152, allowing each engine 102, 104 to independently and individually disengage itself from the gearbox 150, and as such from any downstream load as in 170. Both input modules may be connected within the gearbox 150 and meet at a second reduction stage 155, the first reduction stage and the second reduction stage 155 having their own reduction ratio. The common output shaft 158 may couple the second reduction stage 155 to the tail rotor 110 while another shaft (not shown) may couple the second reduction stage 155 to the main rotor 108.

In the present description, while the aircraft conditions (e.g., cruise speed and altitude) are substantially stable, the engines 102, 104 of the system 105 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or the aforementioned AOR, wherein one of the two engines is operated in a lower-power (which could be no power, in some cases) "standby mode" while the other engine is operated in a high-power "active" mode. Such an asymmetric operation may be engaged, for instance, for a cruise phase of flight (continuous, steady-state flight which is typically at a given commanded constant aircraft cruising speed and altitude). The multi-engine system 105 may be used in an aircraft, such as the helicopter 100, but also has applications in suitable marine and/or industrial applications or other ground operations.

Referring still to FIG. 1B, according to the present description, the multi-engine system 105 is driving in this example the helicopter 100 which may be operated in the AOR, in which a first of the turboshaft engines (say, 102) may be operated at high power in an active mode and the second of the turboshaft engines (104 in this example) may be operated in a lower-power (which could be no power, in some cases) standby mode. In one example, the first turboshaft engine 102 may be controlled by the controller(s) 210 to run at full (or near-full) power conditions in the active mode, to supply substantially all or all of a required power and/or speed demand of the common load 170. The second turboshaft engine 104 may be controlled by the controller(s) 210 to operate at lower-power or no-output-power conditions to supply substantially none or none of a required power and/or speed demand of the common load 170. In some embodiments, the clutch 152 may be provided to permit each engine 102, 104 to be engaged and disengaged (i.e. clutched and de-clutched from the aircraft's main gearbox, as desired.

Controller(s) 210 may control the engine's governing on power according to an appropriate schedule or control regime. The controller(s) 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104.

In another example, the AOR of the engines 102, 104 may be achieved through the one or more controller's 210 differential control of fuel flow to the engines 102, 104, as described in U.S. Patent Application Publication No. 2020/0049025, the entire contents of which are incorporated herein by reference. Low fuel flow may also include zero fuel flow in some examples.

Although various differential control between the engines 102, 104 of the engine system 105 are possible, in one particular embodiment the controller(s) 210 may correspondingly control fuel flow rate to each engine 102, 104 accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the AOR, the standby engine may be maintained between 70% and 99.5% less than the fuel flow to the active engine. In some embodiments, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 210 may operate one engine (say 104) of the multiengine system 105 in a standby mode at a power substantially lower than a rated (e.g., cruise) power level of the engine, and in some embodiments at substantially zero output power and in other embodiments less than 10% output power relative to a reference power (provided at a reference fuel flow). Alternatively still, in some embodiments, the controller(s) 210 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 105 of FIG. 1B may be operated in an AOR by control of the relative speed of the engines using controller(s) 210, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the AOR, such as control based on a target pressure ratio, or other suitable control parameters.

Although the examples described herein illustrate two engines, AOR is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say 102) may operate in the active mode while the other turboshaft engine (say 104) may operate in the standby mode, as described above. During operation in the AOR, if the helicopter 100 needs a power increase (expected or otherwise), the second turboshaft engine 104 may be required to provide more power relative to the low power conditions of the standby mode, and possibly return immediately to a high- or full-power condition. This may occur, for example, in an emergency condition of the multi-engine system 105 powering the helicopter 100, wherein the "active" engine loses power and the power recovery from the lower power to the high power may take some time. Even absent an emergency, it will be desirable to repower the standby engine to exit the AOR.

Figure 2:
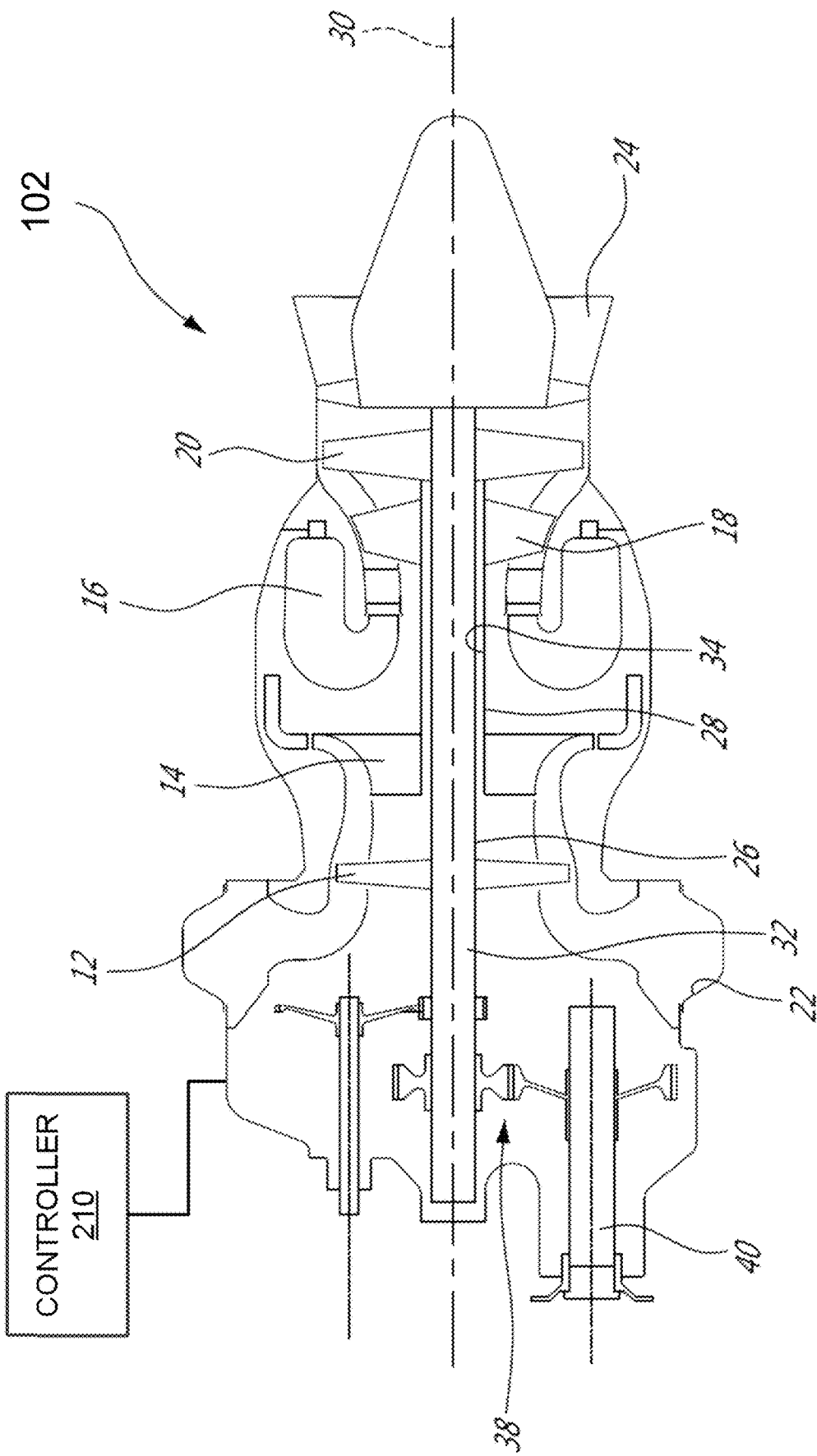
FIG. 2 is a cross-sectional view of an example turboshaft engine of the aircraft of FIG. 1A, in accordance with an illustrative embodiment.

With reference to FIG. 2, the turboshaft engines 102, 104 can be embodied as gas turbine engines. Although the foregoing discussion relates to engine 102, it should be understood that engine 104 can be substantively similar to engine 102. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 102 may include a transmission 38 driven by the low pressure shaft 32 and driving a rotatable output shaft 40. The transmission 38 may vary a ratio between rotational speeds of the low pressure shaft 32 and the output shaft 40.

As described hereinabove, control of the operation of the engine 102 can be effected by one or more control systems, for example the controller 210. The controller 210 can modulate a fuel flow rate provided to the engine 102, the position and/or orientation of variable geometry mechanisms within the engine 102, a bleed level of the engine 102, and the like. In some embodiments, the controller 210 is configured for controlling operation of multiple engines, for instance the engines 102 and 104. For example, the controller 210 can be provided with one or more FADECs or similar devices. Each FADEC can be assigned to control the operation of one or more of the engines 102, 104. Additionally, in some embodiments the controller 210 can be configured for controlling operation of other elements of the aircraft 100, for instance the main rotor 108.

Figure 3:
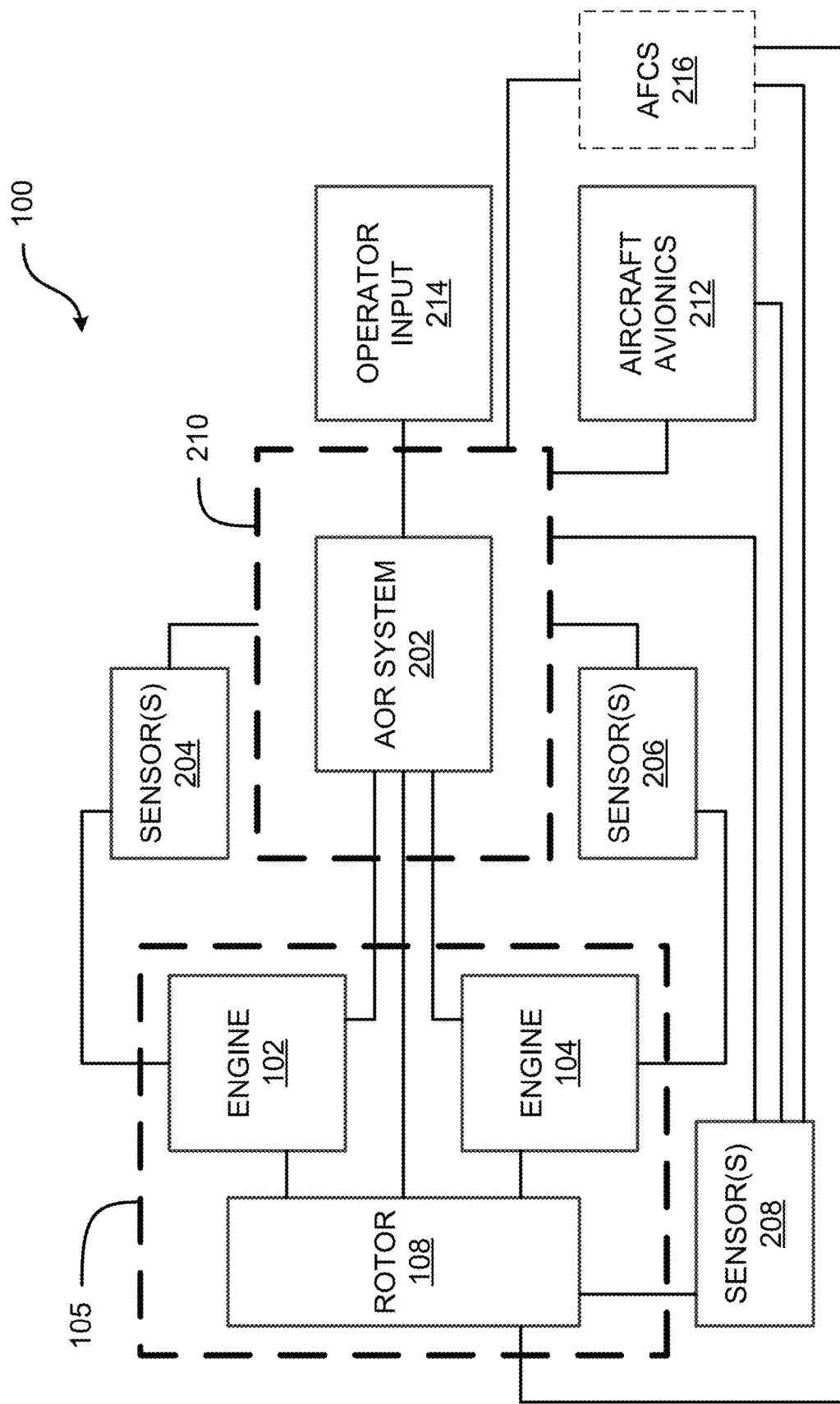
FIG. 3 is a block diagram of an example architecture for operating a multi-engine aircraft, in accordance with an illustrative embodiment.

With reference to FIG. 3, the aircraft 100, comprising the engines 102, 104 and the rotor 108, is illustrated using a block diagram. More than two engines 102, 104 may be present on a same aircraft 100. The engines 102, 104 are mechanically coupled to the main rotor 108, for instance as illustrated in FIG. 1B, for causing the rotor 108 to rotate and produce thrust for the aircraft 100. Although FIG. 3 illustrates a singular rotor 108, it should be noted that the aircraft 100 can include any number of rotors, including multiple main rotors, one or more tail rotors, and the like. Collectively, the engines 102, 104, and the rotor 108 form part of the multi-engine system 105, which is controlled by the controller 210.

The multi-engine system 105 can be controlled by way of the controller 210, as described hereinabove. The controller 210 can be composed of various devices, including one or more FADEC(s), EEC(s), ECU(s), rotor controller(s), or any other suitable devices for controlling operation of the engines 102, 104, and/or the rotor 108. In some embodiments, the operation of the engines 102, 104, and of the rotor 108 is controlled by way of one or more actuators, mechanical linkages, hydraulic systems, and the like. The controller 210 can be coupled to the actuators, mechanical linkages, hydraulic systems, and the like, in any suitable fashion for effecting control of the engines 102, 104 and/or of the rotor 108. For example, if a change in the operating conditions of the aircraft 100 is detected without any corresponding change in inputs from an operator of the aircraft 100, the controller 210 can adjust inputs provided to the engines 102, 104 and/or the rotor 108 in order to compensate for the uncommanded change.

The controller 210 can be provided with an AOR system 202 which is configured to control operation of the engines 102, 104, prior to entry into the AOR, when the aircraft 100 is operating in the AOR, and upon exit from the AOR. As previously noted, in some embodiments, when operating in the AOR, one of the engines, for example engine 102, is set as the so-called "active engine", and the other engines, in this example engine 104, is set as the so-called "standby engine". It should be noted that the association between engines 102, 104 and the active/standby status is solely for the purposes of example. In certain embodiments, prior to entry into, or exit from, the AOR, it is desirable for various operating parameters of the engines 102, 104, the rotor 108, and/or the aircraft 100, to meet certain operating conditions associated with the AOR. In particular, it is desirable for these operating parameters to be within predetermined bands and/or at, below, or above certain predetermined values. When one or more operating parameters no longer meet the operating conditions, the AOR may be exited.

One or more sensors 204, 206 are coupled to the engines 102, 104, for acquiring data about the operating parameters of the engines 102, 104. Additionally, sensor(s) 208 are coupled to the rotor 108 for acquiring data about the operating parameters of the rotor 108. The sensor(s) 204, 206, 208 may be any suitable type of sensor used to measure (continuously or periodically) operating parameters. The sensor(s) 204, 206, 208 includes, but are not limited to, speed sensors, acceleration sensors, pressure sensors, temperature sensors, altitude sensors, and the like. The sensor(s) 204, 206, 208, can be coupled to the controller 210 in any suitable fashion, including any suitable wired and/or wireless coupling techniques. It should be noted that not all the operating parameters used to determine whether certain aircraft operating conditions for the AOR are met or no longer met come from the sensor(s) 204, 206, 208. In some embodiments, operating parameters may be received from one or more other sources, including but not limited to a FADEC, an ECU, an EEC, or any related accessories that control any aspect of engine performance. In some embodiments, measurements obtained from the sensor(s) 204, 206, 208 are used to calculate or determine other related parameters.

Aircraft parameters may also be monitored to determine whether certain aircraft operating conditions for the AOR are met or no longer met. In some embodiments, the aircraft parameters are obtained from aircraft avionics 212, e.g. from sensor(s) 208. The aircraft avionics 212 may include any and all systems related to control and management of the aircraft 100, such as but not limited to communications, navigation, display, monitoring, flight-control systems, collision-avoidance systems, flight recorders, weather systems, and aircraft management systems. The aircraft avionics 212 are therefore communicatively coupled to the controller 210, including the AOR system 202. In some embodiments, the aircraft avionics 212 perform all monitoring of the aircraft parameters and communicate with the AOR system 202 when the aircraft operating conditions for the AOR are met or no longer met. Alternatively or in combination therewith, monitoring of some or all operating parameters of the aircraft is performed externally to the AOR system 202 and involves an operator of the aircraft 100 (e.g., a pilot) monitoring some or all of the parameters and providing input (e.g., instructions) to the controller 210, and more specifically to the AOR system 202, via operator input 214.

In some embodiments, the controller 210, and particularly the AOR system 202, effects changes in flight controls via an optional automatic flight control system (AFCS) 216 communicatively coupled with the controller 210, the sensor(s) 208, and the rotor 108. The AFCS 216 may be configured for adjusting one or more inputs acquired from the operator input 214. In some embodiments, the AFCS 216 can adjust the inputs by way of mechanical linkages, actuators, or the like, which adjust the position and/or orientation of various surfaces and mechanical machines. In other embodiments, the AFCS 216 can adjust analog or digital signals transmitted to actuators or other devices which control operation of the engines 102, 104, and/or the rotor 108. Other embodiments may apply.

In some embodiments, the AOR system 202 monitors engine and/or aircraft operating conditions required to enter and exit the AOR. Monitoring may be done continuously or by periodical queries. If at any time the operating conditions are not respected, the AOR system 202 either exits (i.e. aborts) or disables (i.e. prevents entry into) the AOR. In addition, while the aircraft 100 may be able to operate (e.g., during standard cruise conditions) with only one of the two engines 102, 104 providing motive power to the aircraft 100, it may in some instances be necessary for the standby engine to transition out of its low power operating condition. This might be the case, for example, if the pilot requires additional power quickly in order to perform a flight maneuver, or in the event of an emergency caused by mechanical failure of the active engine. However, such rapid transitions from low-power to high-power running conditions cause rapid temperature and pressure increases within the transitioning engine (i.e. the standby engine). Such thermal gradients cause significant thermal stresses on the transitioning engine, which can negatively impact part lifespan.

As will be discussed further below, it is therefore proposed herein to use the controller 210, and more particularly the AOR system 202, to provide two distinct modes of operation (also referred to herein as "exit modes") for transitioning a standby engine from low/no power operation to high(er) power operation and therefore exit the AOR. The two modes of operation are an emergency exit mode and a non-emergency (or "normal") exit mode. In the emergency exit mode, the AOR system 202 is configured to cause a rapid increase in engine power of both the standby engine and the active engine. In the non-emergency exit mode, the power output of the standby engine is increased at a slower pace, over one or more transitional phases (referred to herein as "warm-up" phases or periods), such as to limit thermal gradients and extend hardware life.

Figure 4A:
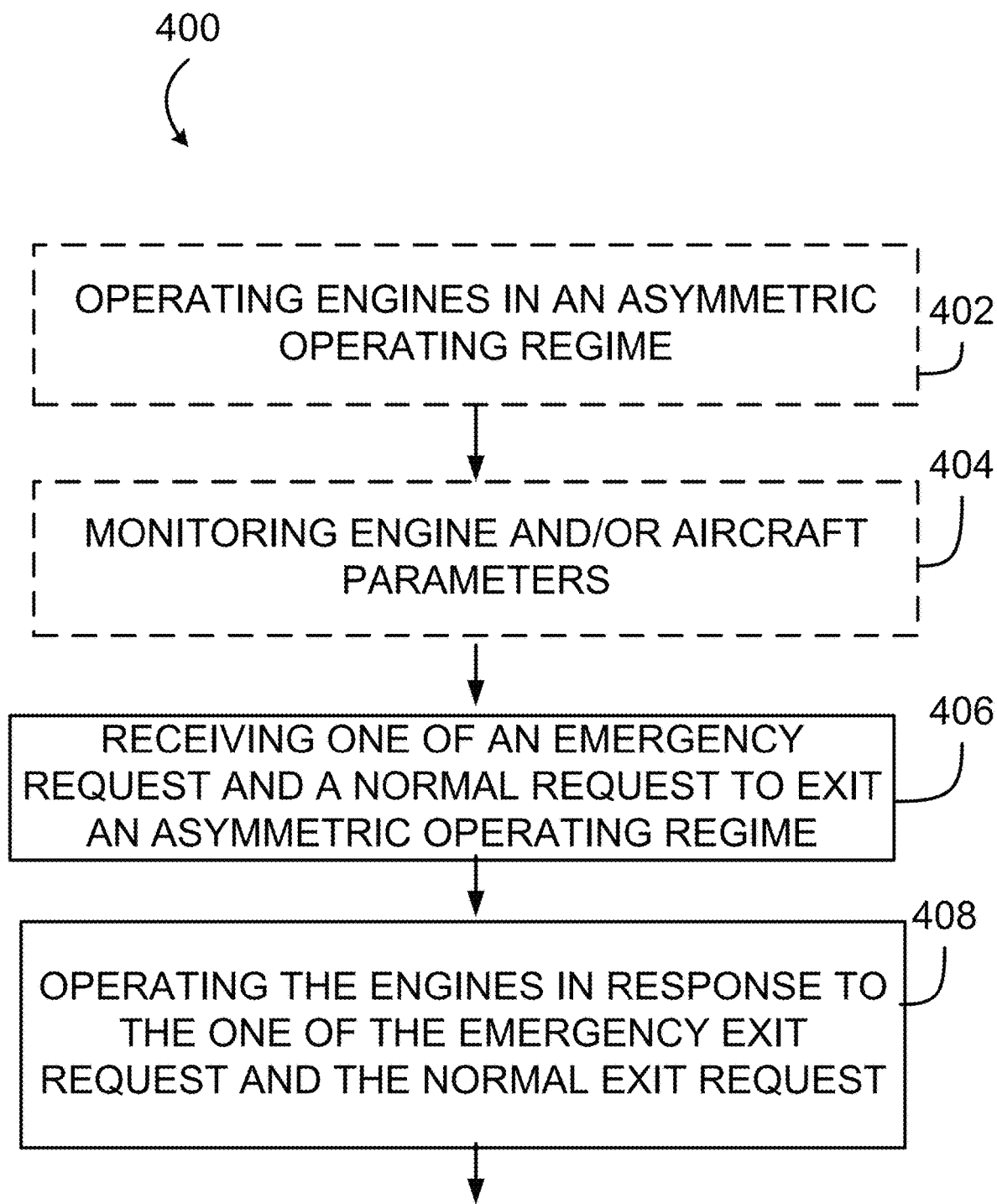
FIG. 4A is a flowchart of an example method for operating a multi-engine aircraft, in accordance with an illustrative embodiment.
Figure 4B:
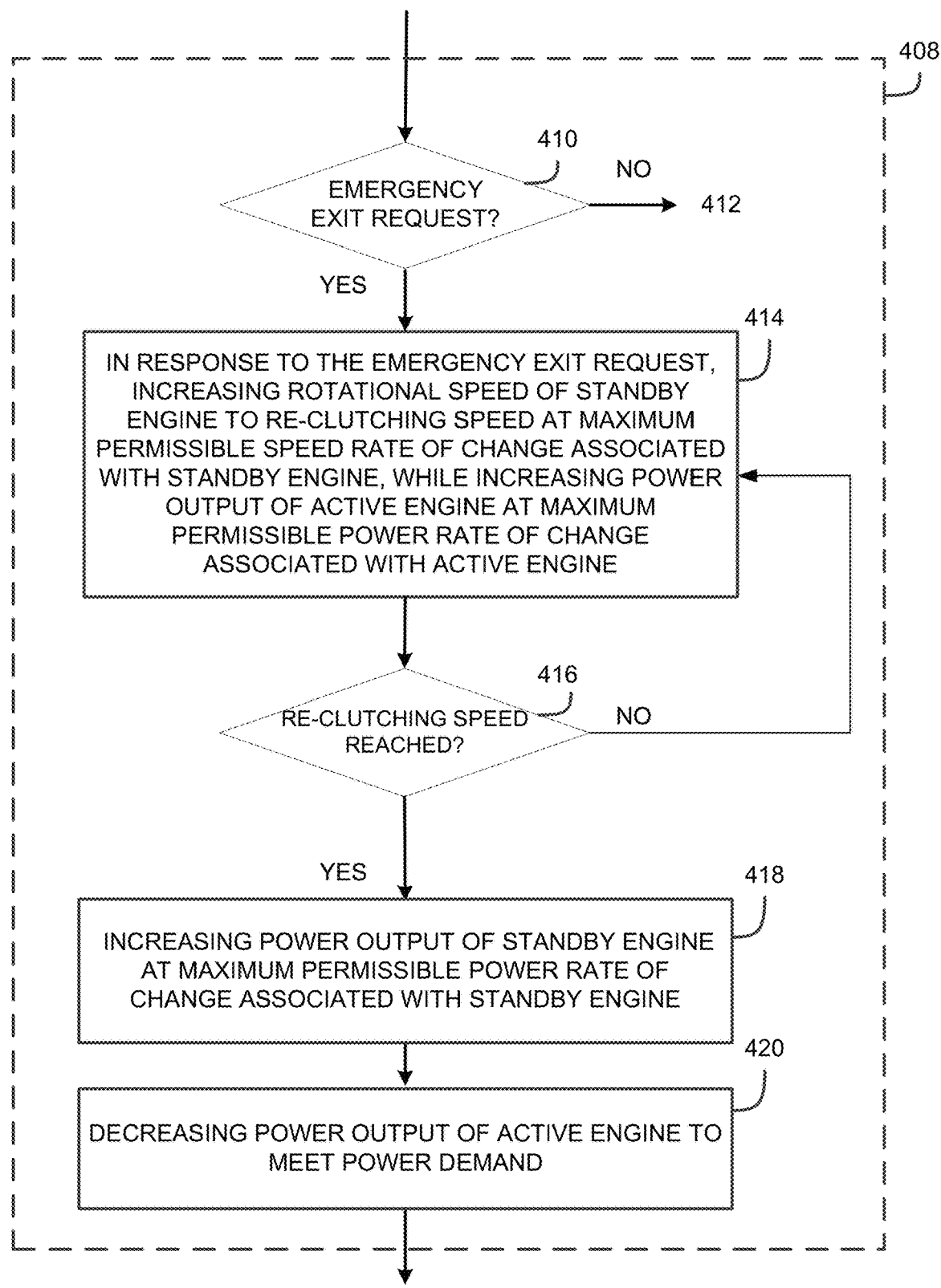
FIG. 4B is a flowchart of the step of operating the engines of the multi-engine aircraft in response to an emergency exit request, in accordance with an illustrative embodiment.
Figure 4C:
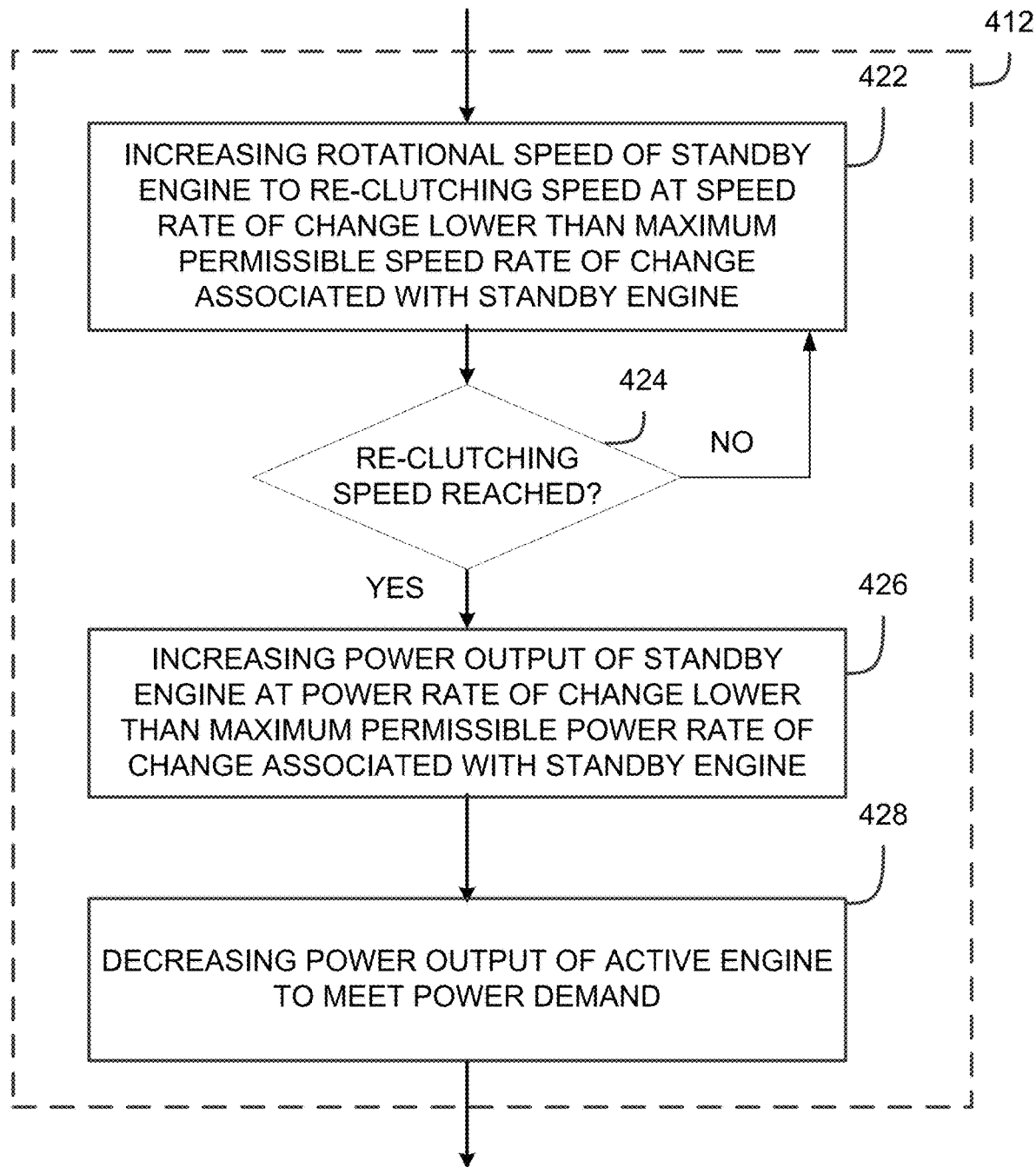
FIG. 4C is a flowchart of the step of operating the engines of the multi-engine aircraft in response to a normal exit request, in accordance with an illustrative embodiment.

Referring now to FIG. 4A, FIG. 4B, and FIG. 4C, a method 400 for operating a multi-engine aircraft, such as the aircraft 100 of FIG. 3, will now be described in accordance with one embodiment. The method 400 is illustratively performed by the controller (reference 210 in FIG. 3), and more particularly by the AOR system (reference 202 in FIG. 3).

In some embodiments, the method 400 comprises a step 402 of operating the engines (references 102, 104 in FIG. 3) in AOR. Alternatively, in other embodiments, the method 400 may begin when the engines 102, 104 are already operating in the AOR and step 402 may therefore be omitted. In some embodiments, the method 400 comprises a step 404 of monitoring engine and/or aircraft parameters in order to determine whether the operating conditions for the engines to remain in the AOR are met. The engine and/or aircraft parameters may be monitored in any suitable manner, such as based on data received from one or more sensors, as described herein above with reference to FIG. 3. When the engine and/or aircraft operating conditions are no longer met, one of an emergency request and a normal request to exit the AOR is received at step 406. As used herein, the term "emergency exit request" refers to a request for exiting the AOR according to the emergency exit mode and the term "normal exit request" refers to a request for exiting the AOR according to the non-emergency (or normal) exit mode. For example, if any one of airspeed, altitude, aircraft generator and/or battery status, or avionic health status for optimal asymmetric operation are not respected, a request to exit the AOR would be received at step 406. The request may be received at step 406 in any suitable manner, for example via the operator input (reference 214 in FIG. 3), or from within the controller 210. Other sources for the request are also considered, and it should be understood that the request may be the result of an automated process or issued based on a predetermined schedule or flight plan. In some embodiments, the request received at step 406 includes an indication of one or more desired operating parameters for the aircraft, for instance a current power demand. The next step 408 comprises operating the engines in response to the one of the emergency exit request and the normal exit request in order to transition the engines out of the AOR.

The emergency exit mode may be initiated as a result of a triggering event that causes a system of the aircraft (e.g., the FADEC, EEC, ECU, or an aircraft computer) to generate the emergency exit request (also referred to herein as a "system-commanded request") to exit the AOR. Any suitable triggering event including, but not limited to, rotor droop (i.e. a decrease in the rotor's speed below a target speed, beyond a predetermined tolerance), an One Engine Inoperative (OEI) event (e.g., when the active engine fails and is subject to a loss of power or control), FADEC fault(s), and the receipt of increased power demands exceeding the capability of the active engine, may apply. System-commanded requests may therefore be received by the AOR system 202 in emergency circumstances, based on monitored parameters, including engine power or control. The emergency exit mode may be initiated where a return to a mode of operation outside of the AOR is urgent and should be performed rapidly for safety or security reasons. Upon receipt of the emergency exit request, the AOR system 202 may determine whether it would be safe to return to an "all engines operative" (AEO) rating. For example, the AOR system 202 may review faults and/or conditions which may be impacted or worsened by engine acceleration. If the AOR system 202 determines that the AOR cannot be safely exited, the emergency exit request may be refused and a corresponding notification (e.g., any suitable audible alert, visible alert, sensory alert, or the like) may be provided to the aircraft operator. If the AOR system 202 confirms that the standby engine can return to AEO and that exit from the AOR is safe, the engines are transitioned out of the AOR as quickly as possible in accordance with the emergency exit mode, in the manner that will be described further below. In such circumstances, passenger comfort and engine thermal stabilization are sacrificed for overall aircraft occupant safety. In some embodiments, the aircraft operator may be alerted once the aircraft has successfully exited the AOR.

The non-emergency exit mode may be initiated upon receipt, from a pilot (or from an auto-pilot system) of the aircraft, of a normal exit request, referred to herein as a "pilot-commanded request". The pilot-commanded request may be received via the operator input 214 (e.g., from the cockpit). This may be done using any interface in the cockpit, for example discrete inputs from a button press or a long hold for added protection against inadvertent selection. In one embodiment, pilot-commanded requests may occur in normal circumstances, for example when the end of a cruise segment of a mission is approaching. Such requests may be referred as normal pilot-commanded exit requests. Having both (or all) engines available for aircraft control may be required and thus the AOR is to be exited in favor of an AEO rating. Various mission profiles may require interleaved segments of AEO rating and of the AOR. In some embodiments, the AOR system 202 may determine, upon receipt of a normal pilot-commanded exit request, whether the standby engine is capable of returning to an AEO rating. Upon confirming that the engine can return to AEO, the engine may be transitioned using the non-emergency exit mode of operation.

It should however be understood that, in other embodiments, pilot-commanded requests may occur in emergency circumstances, as described above, and may be referred to as emergency pilot-commanded exit requests. An emergency pilot-commanded exit request may be received when a need for dual engine power and control is required urgently, for example for a rapid abort or for object avoidance. In this case, the engines 102, 104 would be operated according to the emergency exit mode of operation. An emergency pilot-commanded exit request may be received via the cockpit interface, using a different input as the normal pilot-commanded exit request, or using the same input with different parameters (i.e. a longer hold or pressing multiple times on the button). In some embodiments, emergency pilot-commanded exit requests are system-generated in response to a specific pilot-initiated aircraft maneuver. For example, if a pilot reacts to an emergency situation by having the aircraft swerve left at a sharp angle, this may cause the AOR system 202 to generate the pilot-commanded exit request and react accordingly. In some embodiments, emergency pilot-commanded exit requests are system-generated in response to a specific pilot command. For example, if a pilot commands a specific power requirement or a specific rate of change of a power requirement, the AOR system 202 may generate the pilot-commanded exit request and react accordingly.

As illustrated in FIG. 4B, step 408 comprises assessing at step 410 whether an emergency exit request has been received. If this is not the case, meaning that a normal exit request has been received and the exit mode is a normal (i.e. non-emergency) exit mode, the method 400 proceeds to step 412. Otherwise, the next step 414 comprises, in response to the emergency exit request, increasing the rotational speed of the standby engine (from a standby speed) to a re-clutching speed, at a maximum permissible speed rate of change associated with the standby engine. The maximum permissible rate at which the rotational speed of the standby engine is increased (i.e. the maximum permissible speed rate of change) may vary depending on engine configuration and is set at a value that enables the re-clutching speed to be reached as fast as possible (i.e. over the shortest time period possible). The maximum permissible speed rate of change may be determined based on constraints associated with the engine, including, but not limited to, compressor surge margin, maximum fuel flow rate, engine hot section temperature limitation, and the like. In one embodiment, the maximum permissible speed rate of change is 20% per second, such that the rotational speed of the standby engine reaches the re-clutching speed in less than five (5) seconds. Other embodiments may apply. The value of the re-clutching speed may also vary depending on engine configuration and is set to cause the standby engine to re-clutch to the aircraft's main gearbox. In one embodiment, the re-clutching speed corresponds to a maximum rotational speed. In another embodiment, the re-clutching speed corresponds to 100% of a reference governing speed.

Step 414 also comprises increasing the power output of the active engine at a maximum permissible power rate of change associated with the active engine (i.e., within a prescribed power limit), in order to temporarily provide increased power to the aircraft. The maximum permissible rate at which the power output of the active engine is increased (i.e. the maximum permissible power rate of change associated with the active engine) may vary depending on engine configuration. The maximum permissible rate is set such that the output power of the active engine reaches a desired power level over the shortest time period possible. In some embodiments, the prescribed limit corresponds to a maximum output power of the active engine and the power output of the active engine is increased to the maximum output power. In other embodiments, the power output of the active engine is increased to a power level which provides sufficient power to meet the current power demand for the aircraft. In other words, the power output of the active engine is temporarily increased to meet the current power demand of the aircraft.

In some embodiments, the increase in the rotational speed of the standby engine and the increase in the power output of the active engine occur sequentially. As described herein, the standby engine may be configured to be de-clutched from the aircraft's main gearbox and operating at a lower speed than the active engine when in the AOR. As such, after the active engine increases its power output, the standby engine may be configured to initiate a re-clutching process (by increasing its output shaft speed) substantially simultaneously to the active engine increasing its power output. After a predetermined time period, the standby engine is re-clutched to the aircraft's main gearbox and able to increase its output power. In other embodiments, the standby engine may be configured to remain clutched to the aircraft's main gearbox, yet provide zero net output power to the aircraft (i.e. be on the verge of de-clutching) when in the AOR. In that case, both the active engine and the standby engine may increase their output power substantially simultaneously.

The next step 416 is to assess whether the re-clutching speed has been reached. If this is not the case, the method 400 flows back to step 414 of increasing the rotational speed of the standby engine. When the re-clutching speed has been reached (i.e. the standby engine is re-clutched to the aircraft's main gearbox), the next step 418 comprises increasing the power output of the standby engine at a maximum permissible power rate of change associated with the standby engine. The power output of the standby engine is increased to a target power level determined based on the current power demand of the aircraft. In some embodiments, the target power level corresponds to half of the current power demand. The maximum permissible rate at which the power output of the standby engine can be increased (i.e. the maximum permissible power rate of change associated with the standby engine) may vary depending on engine configuration. The maximum permissible rate is set such that the output power of the standby engine reaches the target power level over the shortest time period possible. In some embodiments, the maximum permissible rate is the same for increasing the power output of the active engine at step 414 and for increasing the power output of the standby engine at step 418.

At step 420, the power output of the active engine is decreased (from the level to which it had been increased at step 414) to a power level that allows to maintain target output power requirements of the aircraft and target speed requirements of the rotor 108. In other words, the power output of the active engine is decreased to compensate for the increase in the output power of the standby engine and meet the current power demand of the aircraft. In one embodiment, the power output of the active engine is decreased to the same output power as the standby engine, in a so-called "torque-matching" (also referred to as "power matching" or "equal power split") manner. In other words, the active engine and the standby engine each contributes approximately equally to the total output power in order to meet the current power demand of the aircraft. While reference is made herein to the use of torque-matching, it should be understood that other techniques for load sharing between the active engine and the standby engine, including, but not limited to, inter-turbine temperature matching (in which the engines would provide different output power to target a same inter-turbine temperature) and compressor speed matching (in which the engines would provide different output power to target a same compressor speed), may also apply.

In embodiments where torque-matching is not desired, the power output of the standby engine is increased at step 418 to a target power level which differs from half of the aircraft's current power demand. For example, the standby engine may only provide the amount of output power in excess to what can be continuously provided by the active engine. As a result, in order compensate for the increase in the power output of the standby engine, the power output of the active engine is decreased at step 420 to a different power level than that of the standby engine and the engines do not contribute equally to the total output power.

As illustrated in FIG. 4C, when it is determined at step 410 that a normal exit request is received, a transition period (referred to herein as a "warm-up" period) is applied to the standby engine, in order to limit the thermal gradients within the standby engine, and thus increase the lifespan of the standby engine components susceptible to thermal stress fatigue. The duration of the warm-up period may vary depending on engine configuration, as well as on the atmospheric ambient conditions and operating conditions of the standby engine. More particularly, step 412 comprises increasing the rotational speed of the standby engine to the re-clutching speed at a speed rate of change lower than the maximum permissible speed rate of change associated with the standby engine (step 422). The rotational speed increase occurs over a first time period, during which the active engine remains at its existing power output. The next step 424 then comprises assessing whether the re-clutching speed has been reached. If the re-clutching speed has not been reached, the method 400 flows back to step 422 of increasing the rotational speed of the standby engine. When the re-clutching speed has been reached, the next step 426 comprises increasing the power output of the standby engine at a power rate of change that is lower than the maximum permissible power rate of change associated with the standby engine. The power output is increased at step 426 to a target power level, which is, as described herein above, determined based on the current power demand of the aircraft. In some embodiments, the target power level corresponds to half of the current power demand. The power output of the active engine is also decreased at step 428 to meet the aircraft's current power demand. More specifically, the power output of the active engine is decreased by a corresponding amount as the amount by which the power output of the standby engine is increased. As previously described, in some embodiments, the power output of the active engine may be decreased at step 428 in a torque-matching manner or any other suitable load-sharing manner.

In some embodiments, the power output of the standby engine is increased at step 426 by increasing the power output to a first intermediate (low power) level, which is maintained for a second time period that is significantly (e.g., five (5) to one hundred (100) times) longer than the time period during which the power output of the standby engine is increased in the emergency exit mode (step 418 of FIG. 4B). In this manner, the standby engine is allowed to warm up and thermal stresses imposed on the standby engine during the transition out of the AOR can be limited. The power output of the active engine is also decreased, by a corresponding amount (i.e. to a second intermediate level different from the first intermediate level), over the second time period. After the second time period has elapsed, the power output of the standby engine is increased again (to the target power level) and the power output of the active engine is decreased again (to meet the aircraft's current power demand). In one embodiment, the power outputs of both engines are substantially the same after the warm-up period and torque-matching is achieved. The combined power output to the aircraft can then subsequently be increased if necessary (e.g., upon receipt of an increased power demand), whereby both engines may supply an increased (and even) power output.

The changes in engine rotational speed and output power described herein with reference to FIG. 4B and FIG. 4C may be performed by outputting one or more control signals to actuators or other devices which control operation of the engines 102, 104. The changes (e.g., to achieve a desired power level) may also be effected by performing one or more adjustments to flight controls, including a collective lever input, a cyclic input, a pedal input, and/or any other suitable inputs. The changes can take place over any suitable time period, as described herein above. For instance, in the non-emergency exit mode, the changes in the power levels can take place over several seconds or several minutes, to give the operator of the aircraft 100 sufficient time to react and implement changes to the other flight parameters of the aircraft 100. As will be described further below, the changes in the power output of the active and standby engines can be substantively continuous, in accordance with a predetermined pattern or schedule, or performed in any other suitable fashion. The non-emergency exit mode may indeed provide multiple power output steps during the warm-up phase (as will be discussed further below with reference to FIG. 7B), or an increase in output power (i.e. a quasi slow-acceleration) during the warm-up phase (as will be discussed further below with reference to FIG. 7C). The rotational speed of the standby engine may also be increased in a warm-up phase, with the standby engine decoupled, i.e. targeting a higher rotational speed that is not sufficient to re-clutch the standby engine to the aircraft's main gearbox (as will be discussed further below with reference to FIG. 8). The emergency and non-emergency exit modes may also be performed from a shutdown standby engine (as will be discussed further below with reference to FIG. 9A and FIG. 9B).

Figure 5:
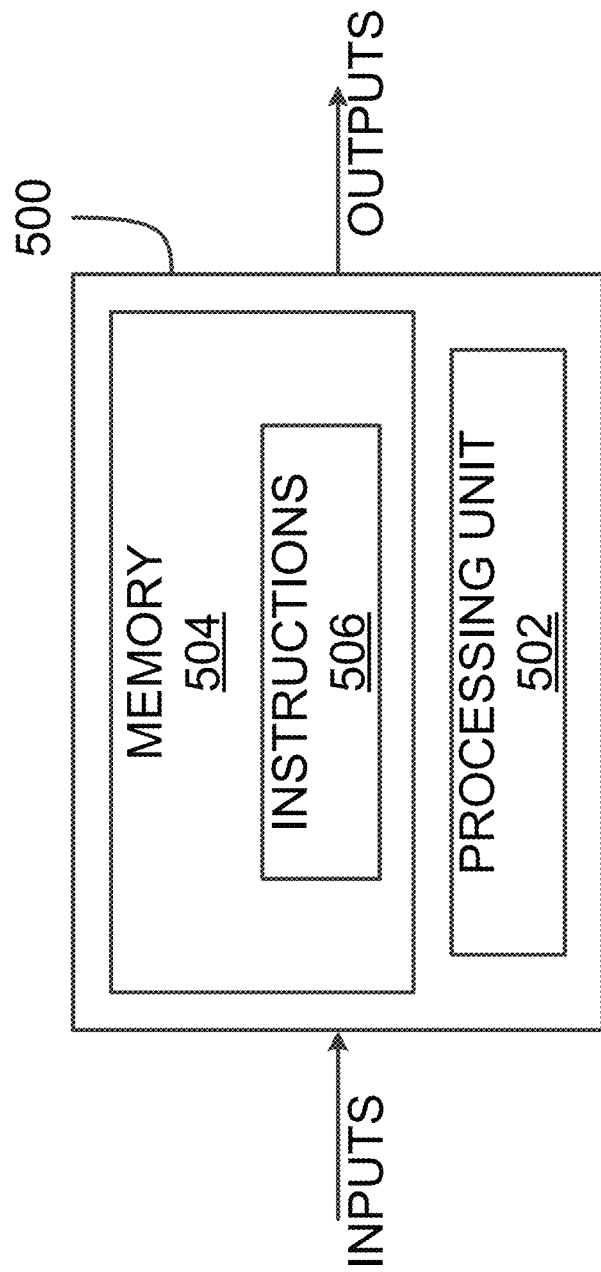
FIG. 5 is a block diagram of an example computing device for implementing the method of FIG. 4A, in accordance with an illustrative embodiment.

With reference to FIG. 5, an example of a computing device 500 is illustrated. For simplicity only one computing device 500 is shown but more computing devices 500 operable to exchange data may apply. The computing devices 500 may be the same or different types of devices. The controller (reference 210 in FIG. 3), and more particularly the AOR system (reference 202 in FIG. 3), may be implemented with one or more computing devices 500. As previously noted, the controller 210 can be implemented as part of a FADEC or other similar device, including EEC, ECU, electronic propeller control, propeller control unit, and the like. Other embodiments may also apply.

The computing device 500 comprises a processing unit 502 and a memory 504 which has stored therein computer-executable instructions 506. The processing unit 502 may comprise any suitable devices configured to implement the method described herein such that instructions 506, when executed by the computing device 500 or other programmable apparatus, may cause the functions/acts/steps performed as part of the method as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for operating a multi-engine aircraft described herein may be implemented in a high level procedural or object oriented programming or scripting language, or a combination thereof, to communicate with or assist in the operation of a computer system, for example the computing device 500. Alternatively, the methods and systems for operating a multi-engine aircraft may be implemented in assembly or machine language. The language may be a compiled or interpreted language. Program code for implementing the methods and systems for operating a multi-engine aircraft may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating a multi-engine aircraft may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Referring now to FIGS. 6 to 9B, there are shown graphical representations of example approaches for operating a multi-engine aircraft, such as the aircraft 100 of FIG. 3, in order to exit from AOR. Line 601 illustrates the speed of the aircraft's rotor (reference 108 in FIG. 3) as a function of time (in seconds). Line 602 illustrates the rotational speed of the active engine as a function of time and line 604 illustrates the rotational speed of the standby engine as a function of time. In one embodiment, the engine's rotational speed is measured at the engine's output shaft such that lines 602 and 604 represent, for each engine, the speed of rotation of the output shaft. Line 606 illustrates the output power of the active engine as a function of time and line 608 illustrates the output power of the standby engine as a function of time. Line 610 represents the total engine power output, for example the combined output power of the engines 102 and 104 of FIG. 3, as a function of time. In some embodiments, the rotational speed and the output power are expressed, for each engine, as percentages of a reference value. The reference value may be any suitable value, depending on engine configuration. For example, for output power, the reference value may be a take-off power level (as shown in FIGS. 6 to 9B), a maximum power level, a cruise power level, or any other suitable reference power level. Other approaches may apply.

Figure 6:
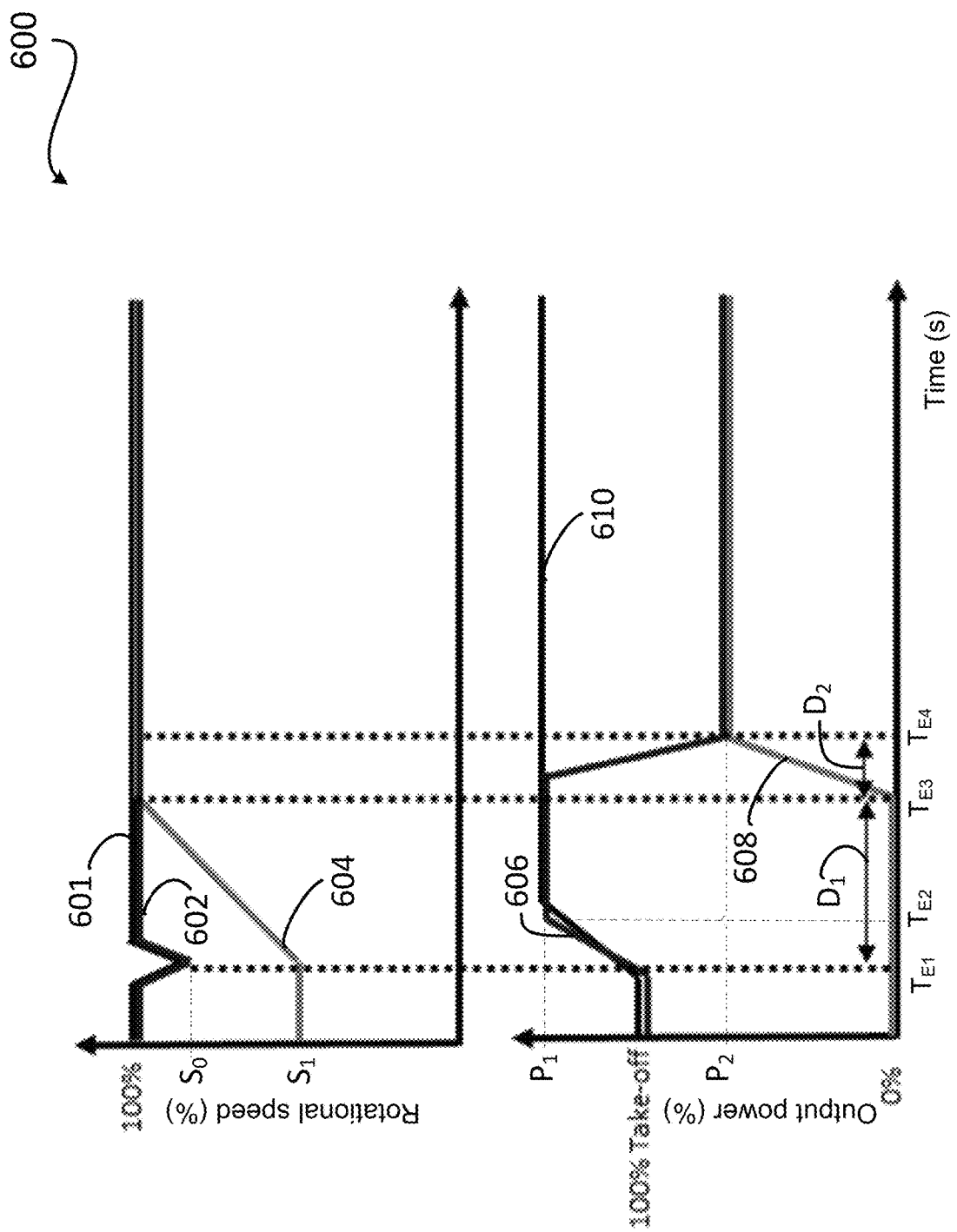
FIG. 6 is a graphical illustration of an example approach for operating the engines of a multi-engine aircraft in response to an emergency exit request, in accordance with an illustrative embodiment.

FIG. 6 illustrates an example approach 600 for operating the aircraft according to the emergency exit mode, in response to receipt of an emergency exit request As described herein above, when the aircraft is operating in the AOR, the standby engine is operated at a lower power than the active engine and the active engine is responsible for supplying substantively all power required by the aircraft. In the illustrated embodiment, the standby engine is not shutdown when the aircraft is operating in the AOR. As a result, the output power and the rotational speed of the active engine are initially set at 100% of take-off power, while the output power of the standby engine is set to 0% of take-off power and the rotational speed of the standby engine is set to a lower, non-zero, value indicated as $S_1$. As will be described further below with reference to FIG. 9A and FIG. 9B, in some embodiments, the standby engine may be shutdown when the aircraft is operating in the AOR, such that its rotational speed may be initially set to zero.

Still referring to FIG. 6, at time $T_{E1}$, a triggering event causes an emergency request to exit the AOR. In the illustrated embodiment, the triggering event is a rotor droop, i.e. a sudden decrease in the rotor's speed (e.g., a 5% drop, from 100% to $S_0$), which results in generation of a system-commanded request to exit the AOR. As previously described, any other suitable triggering event including, but not limited to an OEI event, FADEC fault(s), and a transient power demand exceeding the capability of the active engine, may result in generation of the system-commanded request (or of a pilot-commanded request) to exit the AOR. The emergency exit mode is therefore initiated at time $T_{E1}$, with the rotational speed of the standby engine being rapidly increased, from $S_1$ towards the re-clutching speed of 100%. The output power of the active engine is concurrently increased (e.g., from 100% of take-off power to a higher value indicated as $P_1$), such that the active engine provides as much power as possible (within a prescribed limit) to meet a current power demand of the aircraft. In one embodiment, $P_1$ corresponds to the current power demand (e.g., 140% of take-off power). In other embodiments, the output power of the active engine is increased to the maximum possible power level (e.g., maximum transient power), which may be lower than the current power demand. In the illustrated embodiment, the output power of the active engine reaches $P_1$ at a time $T_{E2}$, at which point the rotor speed has also been brought back to 100%.

At time $T_{E3}$ (i.e. a duration of $D_1$ seconds after $T_{E1}$), the rotational speed of the standby engine reaches the re-clutching speed, causing the standby engine to re-clutch to the aircraft's main gearbox. In one embodiment, the duration $D_1$ is between one (1) and five (5) seconds. With the standby engine re-coupled, the output power of the standby engine is increased, at a maximum permissible rate, from 0% of take-off power towards a target power level $P_2$. The target power level is determined based on the current power demand of the aircraft. The output power of the active engine is also decreased at time $T_{E3}$, by an amount commensurate with the amount by which the output power of the standby engine has been increased. In one embodiment, the target power level is set in order to equalize the output power delivered to the aircraft between the active and the standby engine, thereby achieving torque-matching. For example, if the current power demand is 140% of take-off power, the output powers of the active and the standby engine are adjusted such that each engine is operating at 70% of the demand (i.e. the power output of each engine is adjusted to the target power level $P_2$ of 70% of take-off power). At time $T_{E4}$ (i.e. a duration of $D_2$ seconds after $T_{E4}$), the output power of both the standby engine and the active engine reaches the target power level $P_2$ and operation of the aircraft stabilizes.

Figure 7A:
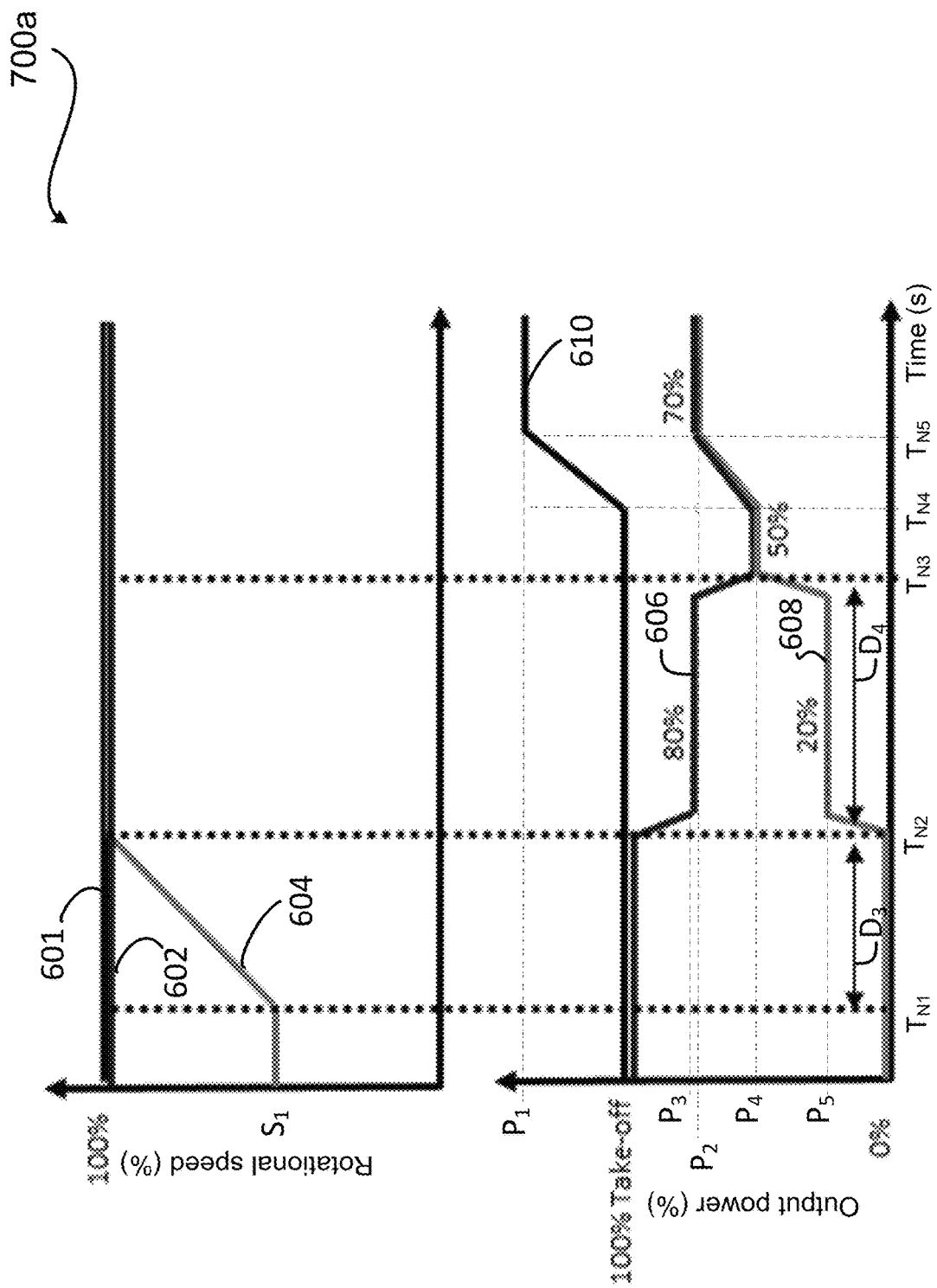
FIGS. 7A to 8 are graphical illustrations of example approaches for operating the engines of a multi-engine aircraft in response to a normal exit request, in accordance with an illustrative embodiment.

FIG. 7A illustrates a first example approach 700a for operating the aircraft according to the non-emergency exit mode. At time $T_{N1}$, a triggering event causes a normal request to exit the AOR. As described herein above, the triggering event may be a pilot-commanded request. The non-emergency exit mode is therefore activated at time $T_{N1}$, with the rotational speed of the standby engine being increased from its standby speed $S_1$ towards the re-clutching speed of 100% over a time period $D_3$. In one embodiment, during this period, the output power of the active engine remains at its current level (e.g., 100% of take-off power). Although not illustrated, it should be understood that, in other embodiments, the output power of the active engine may also be increased over the time period $D_3$ (e.g., from 100% of take-off power to a higher value), at a power rate of change that is lower than the maximum permissible power rate of change associated with the active engine.

At time $T_{N2}$ (i.e. a duration of $D_3$ seconds after $T_{E1}$), the rotational speed of the standby engine reaches the re-clutching speed, causing the standby engine to re-clutch to the aircraft's main gearbox. With the standby engine re-clutched, the output power of the standby engine is increased, from 0% of take-off power towards a target power level $P_4$. The output power of the active engine is also decreased at time $T_{N2}$, to compensate for the increase in output power of the standby engine. In the illustrated example, the current power demand is 100% and the output powers of the active and the standby engine are adjusted such that each engine is operating at 50% of the demand (i.e. the target power level $P_4$ is set to 50% of take-off power).

The adjustment in the output power of the active engine and the standby engine occurs over a predetermined time period referred to herein as a warm-up period, in order to minimize thermal stresses. For this purpose, at time $T_{N2}$, the output power of the standby engine is increased to a first intermediate (low power) level $P_5$ and the output power of the active engine is decreased by a corresponding amount to a second intermediate level $P_3$, with the sum of $P_3$ and $P_5$ corresponding to the current power demand of the aircraft. For example, for a current power demand of 100% of take-off power, $P_5$ may be set to 20% of take-off power and $P_3$ may be set to 80% of take-off power, as illustrated in FIG. 7A. The active engine therefore provides the balance of the power required by the aircraft. It should be understood that, if the power demand of the aircraft becomes such that the current power demand would drive the active engine in the OEI range, the warm-up period would be aborted.

In the illustrated embodiment, at time $T_{N3}$ (i.e. a duration of $D_4$ seconds after $T_{N1}$), the warm-up period is completed and torque matching is re-enabled. For this purpose, the output power of the standby engine is increased to the target power level $P_4$ and the output power of the active engine is also decreased to compensate for the increase in the output power of the standby engine. In the embodiment illustrated in FIG. 7A, the target power level $P_4$ is set to 50% of take-off power, such that the output power of the active engine is decreased to the target power level $P_4$ in order to equalize power between the engines. In order to allow the standby engine time to warm up and thus limit thermal stresses imposed on the standby engine during the transition out of the AOR, the duration $D_4$ of the warm-up period (e.g., 30 seconds) over which the output power of the standby engine is increased in the non-emergency exit mode is longer than the duration $D_3$ (e.g., 3.5 seconds) during which the rotational speed of the standby engine is increased, and also significantly (e.g., five (5) to one hundred (100) times) longer than the duration $D_2$ over which the output power of the standby engine is increased in the emergency exit mode.

Once the equal power split has been reached after time $T_{N3}$, the aircraft is operating in full AEO mode, with corresponding capability. The output power of both engines can then be increased if necessary, to match an increase in the aircraft's power demand. This is illustrated at time $T_{N4}$, where the current power demand of the aircraft increases from 100% take-off power to a power level $P_1$ (e.g., 140% of take-off power). The output power of each of the standby engine and the active engine is therefore increased to a power level $P_2$ (e.g., 70% of take-off power), which is reached at time $T_{N5}$, whereby both engines supply an increased and event power output.

Figure 7B:
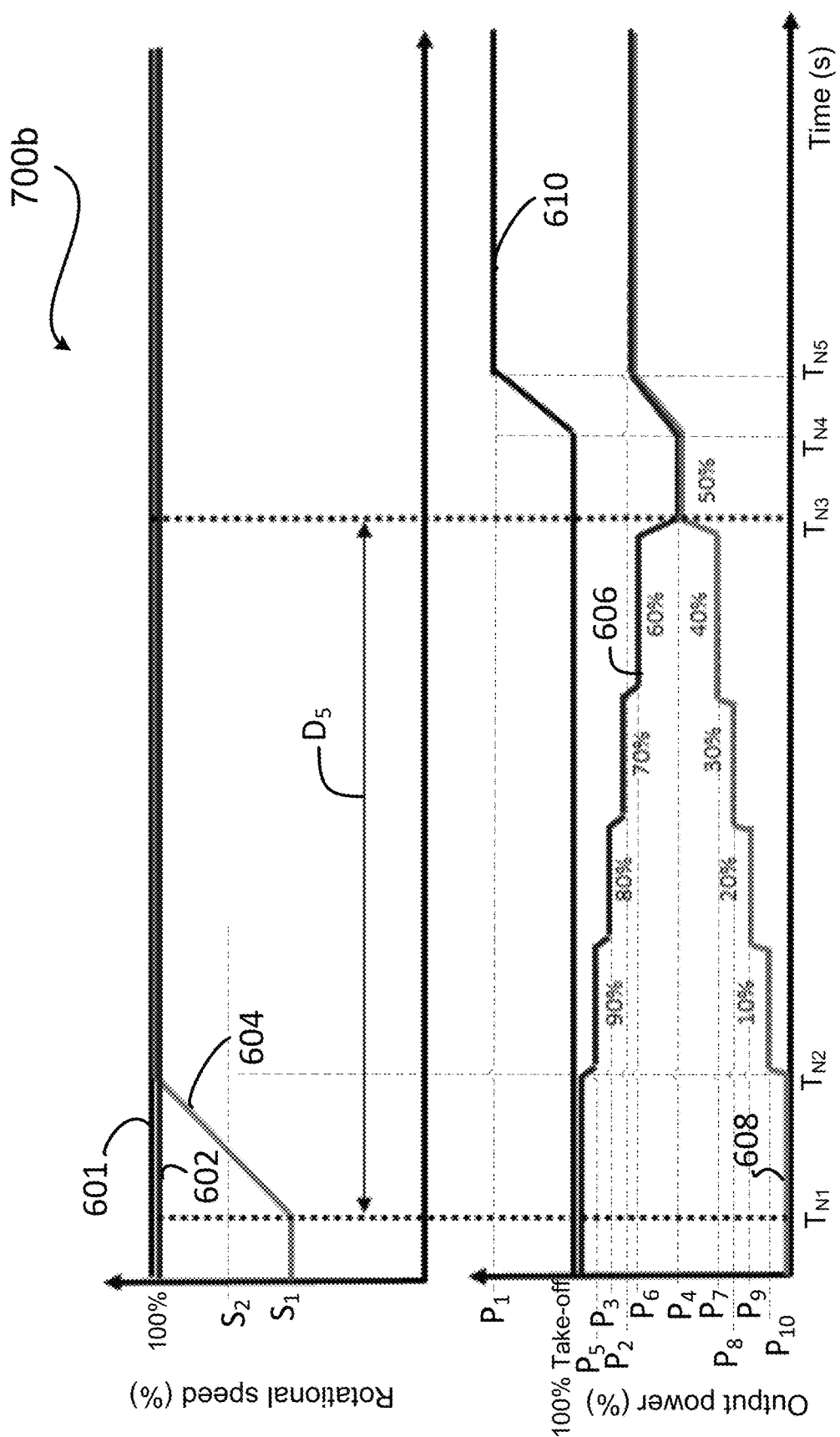

FIG. 7B illustrates a second example approach 700b for operating the aircraft according to the non-emergency exit mode. In the embodiment of FIG. 7B, the output power of each of the active engine and the standby engine is adjusted to several intermediate levels, over a warm-up period $D_5$ (i.e. between times $T_{N2}$ and $T_{N3}$). More specifically, once the standby engine is re-clutched at times $T_{N2}$, the output power of the standby engine is increased from the standby power level (e.g. 0% of take-off power) to a first intermediate power level $P_{10}$ (e.g., 10% of take-off power) and held at the first intermediate power level $P_{10}$ for a given time period. The output power of the standby engine is then increased from the first intermediate power level $P_{10}$ to a second intermediate power level $P_9$ (e.g., 20% of take-off power) and held at the second intermediate power level $P_9$ for a given time period. The output power of the standby engine is then increased from the second intermediate power level $P_9$ to a third intermediate level $P_8$ (e.g., 30% of take-off power) and held at the third intermediate level $P_8$ for a given time period. The output power of the standby engine is then increased from the third intermediate power level $P_8$ to a fourth intermediate level $P_7$ (e.g., 40% of take-off power) and held at the fourth intermediate level $P_7$ for a given time period. The output power of the standby engine is then increased from the fourth intermediate level $P_7$ to the target power level $P_4$ (e.g., 50% of take-off power). The output power of the standby engine may be held at each intermediate power level for the same time period or different time periods.

As shown in FIG. 7B, the output power of the active engine is correspondingly decreased from the active power level (e.g. 100% of take-off power) to a fifth intermediate power level $P_5$ (e.g., 90% of take-off power), from the fifth intermediate power level $P_5$ to a sixth intermediate power level $P_3$ (e.g., 80% of take-off power), from the sixth intermediate power level $P_3$ to a seventh intermediate level $P_2$ (e.g., 70% of take-off power), from the seventh intermediate power level $P_3$ to an eighth intermediate level $P_6$ (e.g., 60% of take-off power), and from the eighth intermediate level $P_6$ to the target power level $P_4$ (e.g., 50% of take-off power). The output power of the active engine may be similarly held at each intermediate power level, for the same time period(s) during which the output power of the standby engine is held.

Figure 7C:
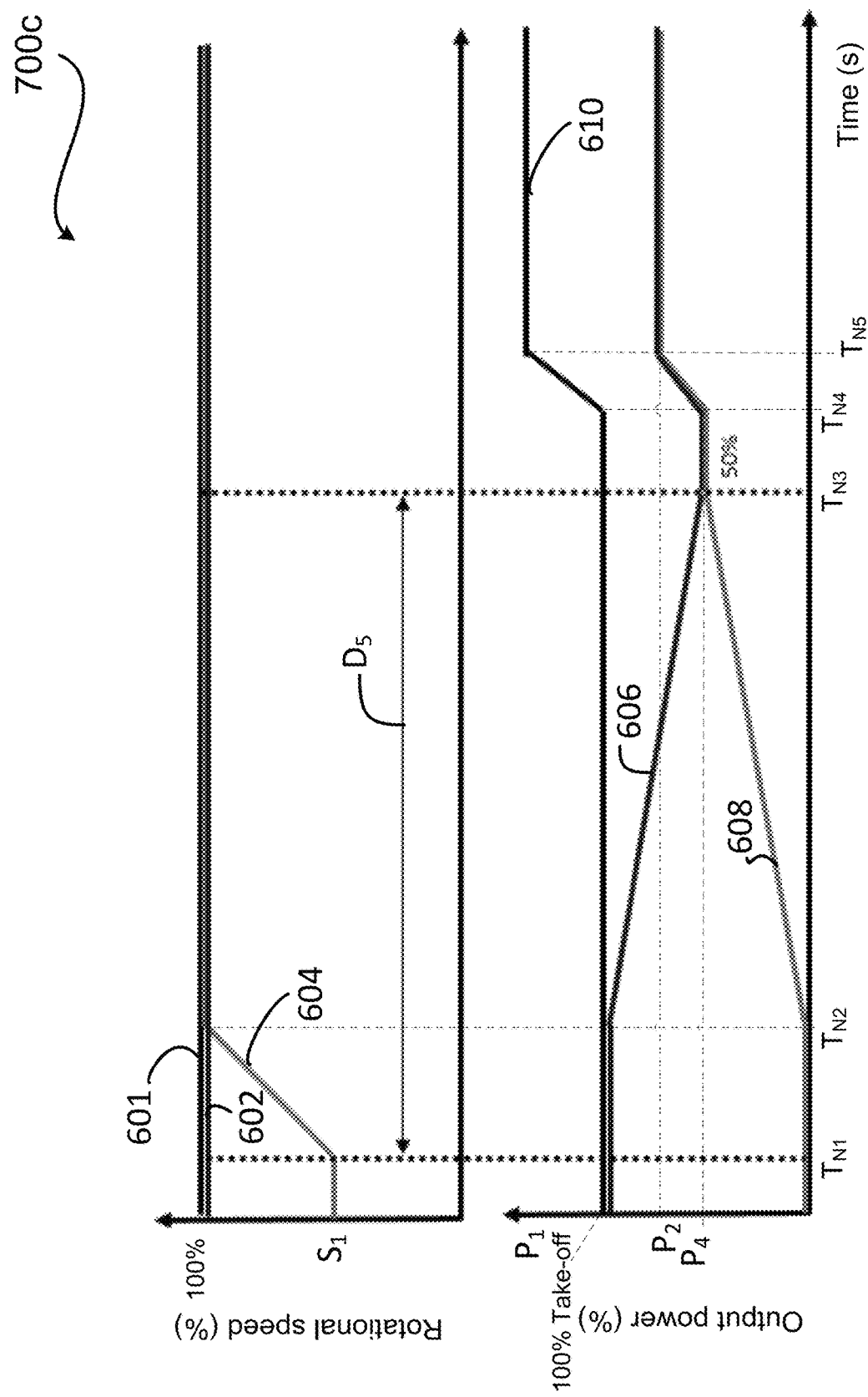

FIG. 7C illustrates a third example approach 700c for operating the aircraft according to the non-emergency exit mode. In the embodiment of FIG. 7C, the output power of each of the active engine and the standby engine is adjusted continuously (e.g., at a predetermined rate) towards the target power level $P_4$ (e.g., 50% of take-off power). The rate of change of the output power of each engine (i.e. the rate of increase of the standby engine's output power and the rate of decrease of the active engine's output power) may depend on engine configuration. The rate of change of the output power is set such that the target power level $P_4$ is achieved after the predetermined warm-up time period $D_5$ has elapsed. For example, in one embodiment, the output power may be adjusted towards the target power level at a rate of 2% per second. Other rates of change may also be used to ensure that sufficient time is allotted for engine thermal stabilization.

Figure 8:
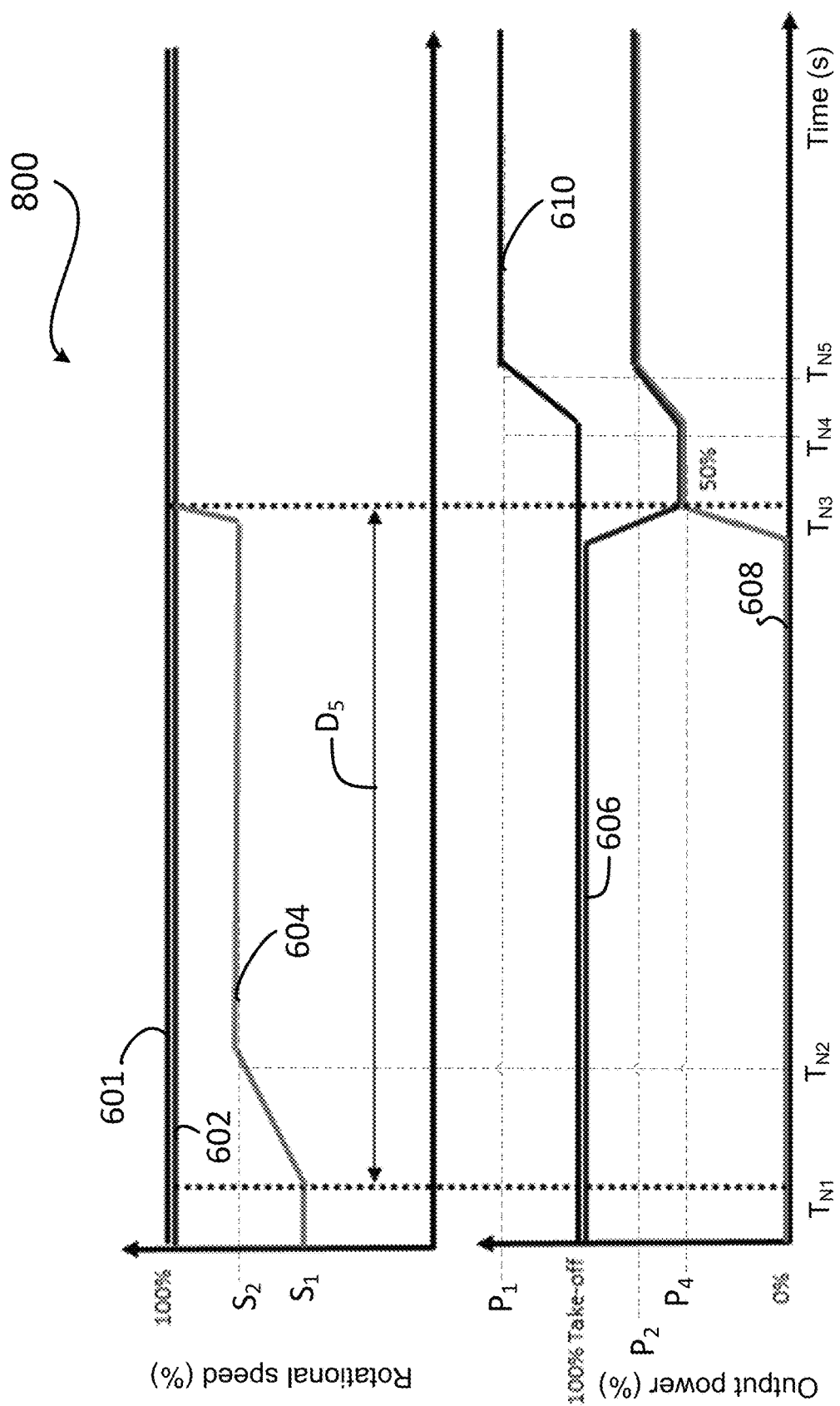

FIG. 8 illustrates another example approach 800 for operating the aircraft according to the non-emergency exit mode. In the embodiment of FIG. 8, the rotational speed of the standby engine is increased at time $T_{N1}$ (i.e. in response to the triggering event causing the request to exit the AOR) in a step-wise manner, over a warm-up period $D_5$. In particular, at time $T_{N2}$, the rotational speed of the standby engine is first increased from its standby speed $S_1$ to an intermediate speed level $S_2$. At time $T_{N3}$, the rotational speed of the standby engine is then increased from the intermediate speed level $S_2$ to the re-clutching speed (100%). It should be understood that more than one intermediate speed levels may apply. The increase from the standby speed $S_1$ to the re-clutching speed illustratively occurs over the warm-up period $D_5$, during which the output power of the standby engine remains at its current level (e.g., 0% of take-off power) and the output power of the active engine remains at its current level (e.g., 100% of take-off power). During the warm-up period $D_5$, the standby engine therefore remains de-clutched from the aircraft's main gearbox since the standby engine first targets a rotational speed ($S_2$) that is not sufficient to re-clutch the standby engine to the aircraft's main gearbox. Re-clutching occurs once the re-clutching speed is reached (at time $T_{N3}$).

Figure 9A:
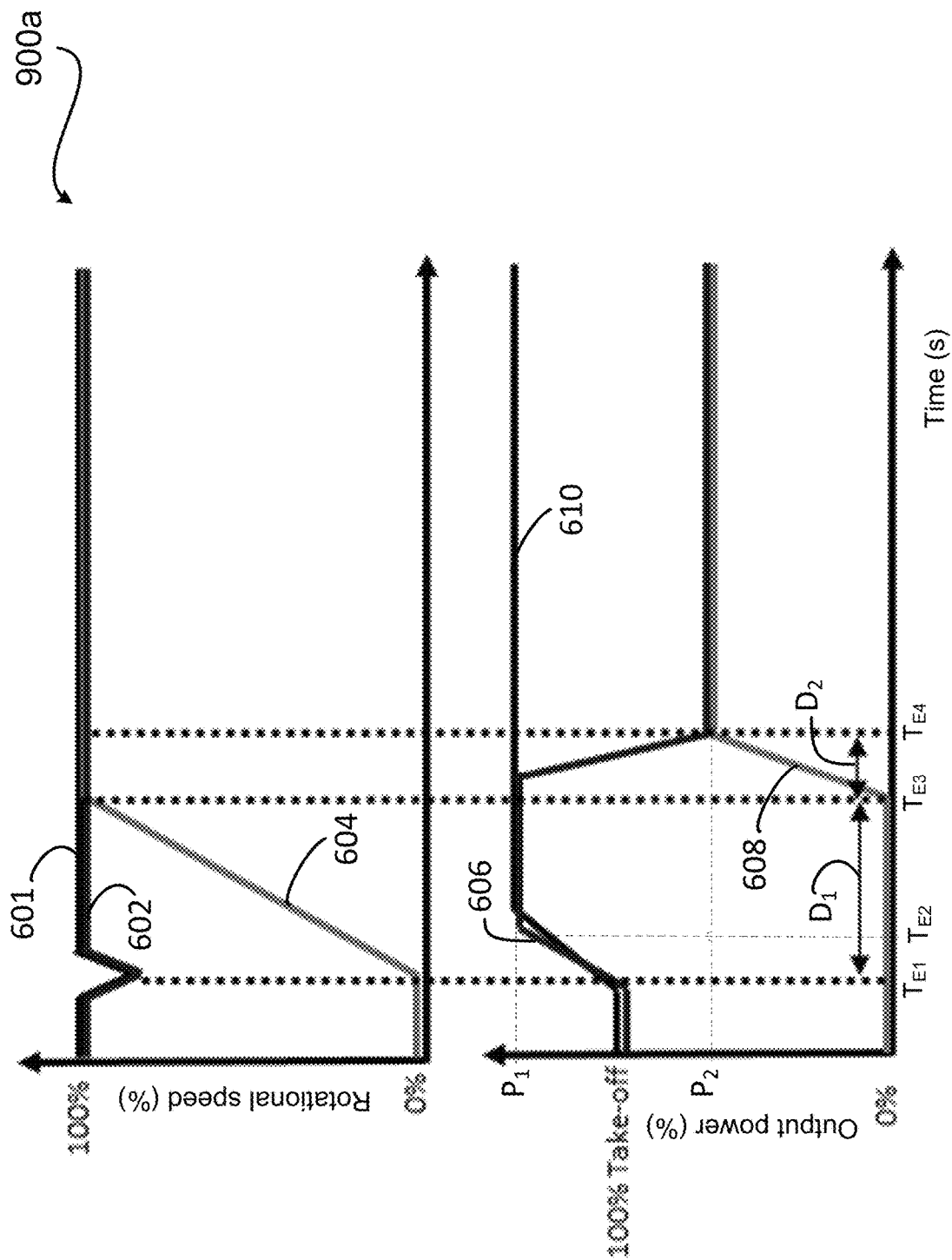
FIGS. 9A and 9B are graphical illustrations of an example approach for operating the engines of a multi-engine aircraft, in accordance with another illustrative embodiment.
Figure 9B:
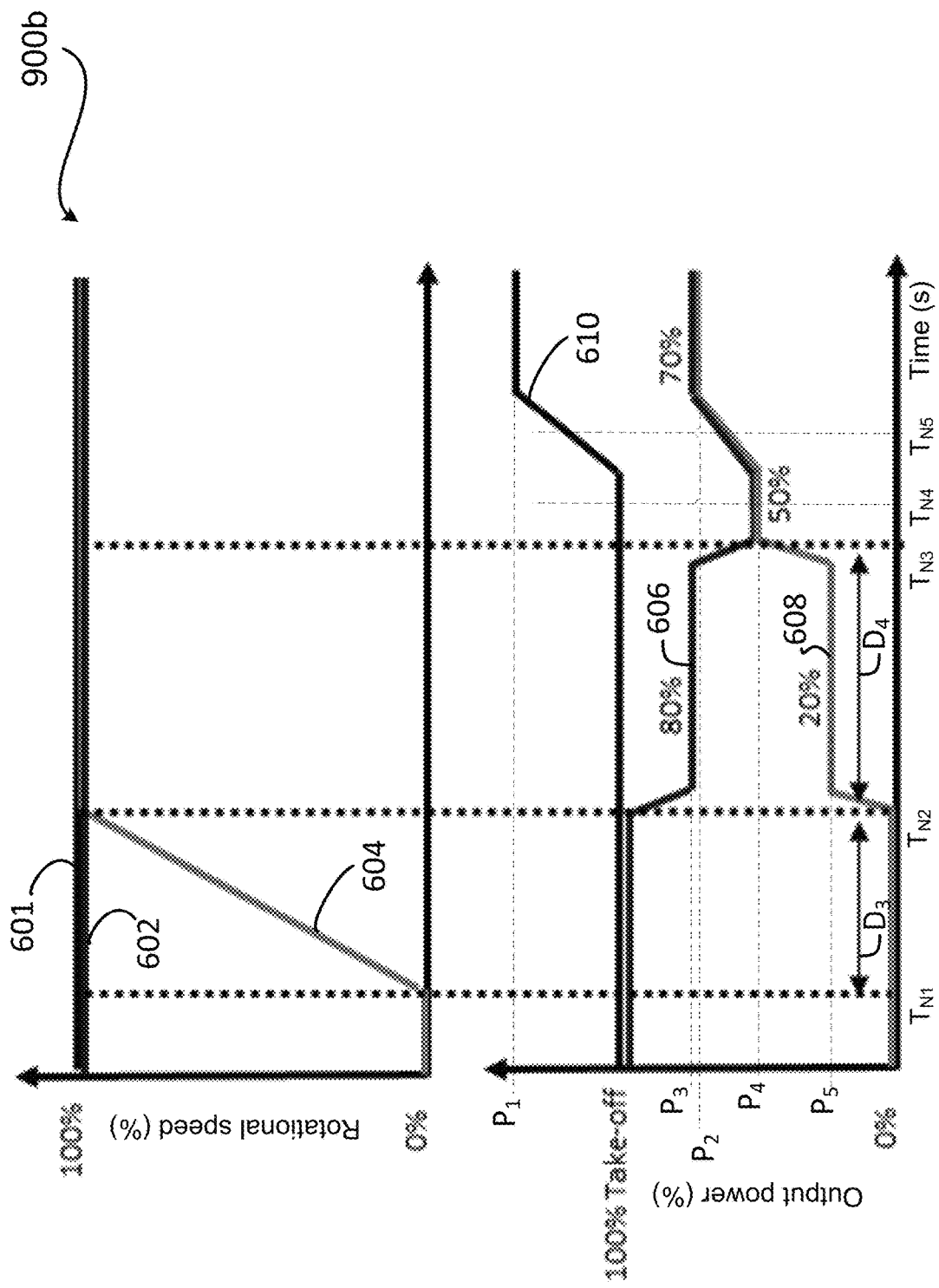

FIG. 9A illustrates another example approach 900*a* for operating the aircraft according to the emergency exit mode, while FIG. 9B illustrates another example approach 900*b* for operating the aircraft according to the non-emergency mode. In the embodiments of FIGS. 9A and 9B, the standby engine is shutdown during AOR operation such that the rotational speed of the standby engine is initially (i.e. before exit from the AOR) set at 0%, rather than at the non-zero standby speed level $S_1$ illustrated in FIGS. 6 to 8. It should therefore be understood that the systems and methods described herein may apply whether the standby engine, which is being transitioned out of its low power operating condition, is initially shutdown or not.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for operating an aircraft having two or more engines, the method comprising:
   operating the aircraft in an asymmetric operating regime in which a first one of the two or more engines is operating in an active mode to provide motive power to the aircraft while a second one of the two or more engines is operating in a standby mode in which the second engine is de-clutched from a gearbox of the aircraft;
   receiving one of:
      an emergency exit request, and
      a normal exit request,
      the receiving the normal exit request comprises receiving a first pilot-commanded request to exit the asymmetric operating regime, and the receiving the emergency exit request comprises receiving a system-commanded request to exit the asymmetric operating regime and/or a second pilot-commanded request to exit the asymmetric operating regime different from the first pilot-commanded request to exit the asymmetric operating regime; and
   in response to the emergency exit request,
      increasing a rotational speed of the second engine, at a maximum permissible speed rate of change associated with the second engine, to a re-clutching speed to re-clutch the second engine to the gearbox while increasing a power output of the first engine at a first maximum permissible power rate of change associated with the first engine, and
      when the rotational speed of the second engine reaches the re-clutching speed, increasing a power output of the second engine at a second maximum permissible power rate of change associated with the second engine.

2. The method of claim 1, further comprising, in response to the normal exit request,
increasing the rotational speed of the second engine to the re-clutching speed at a speed rate of change lower than the maximum permissible speed rate of change associated with the second engine,
when the rotational speed of the second engine reaches the re-clutching speed, increasing the power output of the second engine at a first power rate of change, the first power rate of change being lower than the second maximum permissible power rate of change associated with the second engine.

3. The method of claim 2, wherein, in response to the normal exit request, the rotational speed of the second engine is increased to the re-clutching speed at the speed rate of change while increasing the power output of the first engine at a second power rate of change lower than the first maximum permissible power rate of change associated with the first engine.

4. The method of claim 1, further comprising monitoring at least one of engine parameters and aircraft parameters in order to determine whether operating conditions for the first and second engines to remain in the asymmetric operating regime are met.

5. The method of claim 1, further comprising, when the rotational speed of the second engine reaches the re-clutching speed, decreasing the power output of the first engine to compensate for the increasing of the power output of the second engine, and when the rotational speed of the second engine reaches the re-clutching speed, the power output of the second engine is increased towards a first power level and the power output of the first engine is decreased towards a second power level, a sum of the first power level and the second power level equal to a current power demand of the aircraft.

6. The method of claim 5, wherein, in response to the normal exit request, the increasing the power output of the second engine and the decreasing the power output of the first engine comprise:
increasing the power output of the second engine to at least one first intermediate power level and decreasing the power output of the first engine to at least one second intermediate power level greater than the at least one first intermediate power level, a sum of the at least one first intermediate power level and the at least one second intermediate power level equal to the current power demand; and
after a predetermined time period has elapsed, increasing the power output of the second engine from the at least one first intermediate power level to the first power level and decreasing the power output of the first engine from the at least one second intermediate power level to the second power level.

7. The method of claim 5, wherein, in response to the normal exit request, the increasing the power output of the second engine and the decreasing the power output of the first engine are performed continuously.

8. The method of claim 1, wherein the increasing the rotational speed of the second engine to the re-clutching speed comprises:
increasing the rotational speed of the second engine to a first speed lower than the re-clutching speed; and
a predetermined time period after the rotational speed of the second engine has reached the first speed, increasing the rotational speed of the second engine to the re-clutching speed.

9. The method of claim 1, wherein, in response to the emergency exit request or the normal exit request, the rotational speed of the second engine is increased from a non-zero speed to the re-clutching speed.

10. The method of claim 1, wherein the second engine is shutdown when operated in the standby mode, and further wherein, in response to the emergency exit request or the normal exit request, the rotational speed of the second engine is increased from zero speed to the re-clutching speed.

11. A system for operating an aircraft having two or more engines, the system comprising:
a processing unit; and
a non-transitory storage medium having stored thereon program code executable by the processing unit for:
operating the aircraft in an asymmetric operating regime in which a first one of the two or more engines is operating in an active mode to provide motive power to the aircraft while a second one of the two or more engines is operating in a standby mode in which the second engine is de-clutched from a gearbox of the aircraft;
receiving one of:
an emergency exit request, and
a normal exit request,
the receiving the normal exit request comprises receiving a first pilot-commanded request to exit the asymmetric operating regime, and the receiving the emergency exit request comprises receiving a system-commanded request to exit the asymmetric operating regime and/or a second pilot-commanded request to exit the asymmetric operating regime different from the first pilot-commanded request to exit the asymmetric operating regime; and
in response to the emergency exit request,
increasing a rotational speed of the second engine, at a first maximum permissible speed rate of change associated with the second engine, to a re-clutching speed to re-clutch the second engine to the gearbox while increasing a power output of the first engine at a first maximum permissible power rate of change associated with the first engine, and
when the rotational speed of the second engine reaches the re-clutching speed, increasing a power output of the second engine at a second maximum permissible power rate of change associated with the second engine.

12. The system of claim 11, further comprising, in response to the normal exit request,
increasing the rotational speed of the second engine to the re-clutching speed at a speed rate of change lower than the maximum permissible speed rate of change associated with the second engine, and
when the rotational speed of the second engine reaches the re-clutching speed, increasing the power output of the second engine at a first power rate of change, the first power rate of change being lower than the second maximum permissible power rate of change associated with the second engine.

13. The system of claim 12, wherein the program code is executable by the processing unit for, in response to the normal exit request, increasing the rotational speed of the second engine to the re-clutching speed at the speed rate of change while increasing the power output of the first engine at a second power rate of change lower than the first maximum permissible power rate of change associated with the first engine.

14. The system of claim 11, wherein the program code is executable by the processing unit for monitoring at least one of engine parameters and aircraft parameters in order to determine whether operating conditions for the first and second engines to remain in the asymmetric operating regime are met.

15. The system of claim 11, wherein the program code is executable by the processing unit for, when the rotational speed of the second engine reaches the re-clutching speed, decreasing the power output of the first engine to compensate for the increasing of the power output of the second engine, and when the rotational speed of the second engine reaches the re-clutching speed, the program code is executable by the processing unit for increasing the power output of the second engine towards a first power level and decreasing the power output of the first engine towards a second power level, a sum of the first power level and the second power level equal to a current power demand of the aircraft.

16. The system of claim 15, wherein the program code is executable by the processing unit for, in response to the normal exit request, increasing the power output of the second engine and decreasing the power output of the first engine by:
increasing the power output of the second engine to at least one first intermediate power level and decreasing the power output of the first engine to at least one second intermediate power level greater than the at least one first intermediate power level, a sum of the at least one first intermediate power level and the at least one second intermediate power level equal to the current power demand; and after a predetermined time period has elapsed, increasing the power output of the second engine from the at least one first intermediate power level to the first power level and decreasing the power output of the first engine from the at least one second intermediate power level to the second power level.

17. The system of claim 15, wherein the program code is executable by the processing unit for, in response to the normal exit request, increasing the power output of the second engine and decreasing the power output of the first engine continuously.

18. The system of claim 11, wherein the program code is executable by the processing unit for increasing the rotational speed of the second engine to the re-clutching speed by:
increasing the rotational speed of the second engine to a first speed level lower than the re-clutching speed; and
a predetermined time period after the rotational speed of the second engine has reached the first speed, increasing the rotational speed of the second engine to the re-clutching speed.

19. The system of claim 11, wherein the program code is executable by the processing unit for, in response to the emergency exit request or the normal exit request, increasing the rotational speed of the second engine from a non-zero speed to the re-clutching speed.

20. The system of claim 11, wherein the second engine is shutdown when operated in the standby mode, and further wherein the program code is executable by the processing unit for, in response to the emergency exit request or the normal exit request, increasing the rotational speed of the second engine from a zero speed level to the re-clutching speed.

* * * * *